(12) United States Patent
Yasugi et al.

(10) Patent No.: US 9,041,588 B2
(45) Date of Patent: May 26, 2015

(54) OBJECT DETECTION DEVICE AND OBJECT DETECTION METHOD

(75) Inventors: Makoto Yasugi, Tokyo (JP); Hirofumi Nishimura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 242 days.

(21) Appl. No.: 13/816,810

(22) PCT Filed: Mar. 2, 2012

(86) PCT No.: PCT/JP2012/001448
§ 371 (c)(1),
(2), (4) Date: Feb. 13, 2013

(87) PCT Pub. No.: WO2012/120856
PCT Pub. Date: Sep. 13, 2012

(65) Prior Publication Data
US 2013/0335259 A1    Dec. 19, 2013

(30) Foreign Application Priority Data

Mar. 10, 2011   (JP) ................................ 2011-053166

(51) Int. Cl.
*G01S 7/292* (2006.01)
*G01S 7/295* (2006.01)
(Continued)

(52) U.S. Cl.
CPC ............... *G01S 13/867* (2013.01); *G01S 13/04* (2013.01); *G01S 7/414* (2013.01); *G01S 13/56* (2013.01); *G01S 13/52* (2013.01); *G01S 7/295* (2013.01);
(Continued)

(58) Field of Classification Search
CPC ......... G01S 7/292–7/2955; G01S 7/41–7/415; G01S 13/04; G01S 13/52; G01S 13/56; G01S 13/86–13/867
USPC .............. 342/52–55, 70–72, 89–97, 175, 189
See application file for complete search history.

(56) References Cited

U.S. PATENT DOCUMENTS 5,806,019 A * 9/1998 Ishiyama ...................... 701/300
6,492,935 B1 * 12/2002 Higuchi .......................... 342/70
(Continued)

FOREIGN PATENT DOCUMENTS

| | | | |
|---|---|---|---|
| JP | 2004-37239 A | 2/2004 |
| JP | 2005-164492 A | 6/2005 |
| JP | 2005-182137 A | 7/2005 |
| JP | 2006-134035 A | 5/2006 |
| JP | 2006-292621 A | 10/2006 |

(Continued)

OTHER PUBLICATIONS

International Search Report for PCT/JP2012/001448 dated May 1, 2012.

*Primary Examiner* — Peter Bythrow
(74) *Attorney, Agent, or Firm* — Pearne & Gordon LLP

(57) ABSTRACT

Disclosed is an object detection device capable of improving object detection accuracy by preventing erroneous combination detection. In this device, a detection object region correction unit (103) corrects a detection object region set by a detection object region set unit (102) on the basis of moving speed map information associated with a coordinate group in a reference image plane and the detected moving speed on each coordinate, which is detected by a radar. Thus, the detection object region can be amended by the use of the moving speed map information even when the detection object region is obtained as a result of erroneous combination. As a result, the object detection accuracy can be improved.

14 Claims, 22 Drawing Sheets

(51) Int. Cl.

| | |
|---|---|
| *G01S 13/86* | (2006.01) |
| *G01S 13/75* | (2006.01) |
| *G01V 8/10* | (2006.01) |
| *G08G 1/04* | (2006.01) |
| *G08G 1/052* | (2006.01) |
| *G06K 9/00* | (2006.01) |
| *G06K 9/32* | (2006.01) |
| *G06K 9/62* | (2006.01) |
| *G01S 13/04* | (2006.01) |
| *G01S 7/41* | (2006.01) |
| *G01S 13/56* | (2006.01) |
| *G01S 13/52* | (2006.01) |

(52) U.S. Cl.
CPC .. *G01S 7/41* (2013.01); *G01S 7/292* (2013.01); *G01V 8/10* (2013.01); *G08G 1/04* (2013.01); *G08G 1/052* (2013.01); *G01S 13/86* (2013.01); *G06K 9/00785* (2013.01); *G06K 9/00214* (2013.01); *G06K 9/3241* (2013.01); *G06K 9/6293* (2013.01)

(56) References Cited

U.S. PATENT DOCUMENTS

| | | | | |
|---|---|---|---|---|
| 6,590,521 | B1* | 7/2003 | Saka et al. | 342/70 |
| 6,650,235 | B2* | 11/2003 | Shirai et al. | 340/435 |
| 7,136,753 | B2* | 11/2006 | Samukawa et al. | 701/301 |
| 7,403,659 | B2* | 7/2008 | Das et al. | 382/224 |
| 2002/0113728 | A1* | 8/2002 | Munger | 342/95 |
| 2003/0114964 | A1* | 6/2003 | Strumolo | 701/1 |
| 2004/0098224 | A1* | 5/2004 | Takahashi | 702/181 |
| 2006/0115113 | A1* | 6/2006 | Lages et al. | 382/103 |
| 2008/0150786 | A1* | 6/2008 | Breed | 342/53 |
| 2009/0109083 | A1* | 4/2009 | Tietjen | 342/91 |
| 2010/0026555 | A1* | 2/2010 | Whittaker et al. | 342/70 |
| 2010/0097200 | A1* | 4/2010 | Hilsebecher et al. | 340/436 |
| 2011/0137527 | A1* | 6/2011 | Simon et al. | 701/45 |
| 2012/0119894 | A1* | 5/2012 | Pandy | 340/435 |

FOREIGN PATENT DOCUMENTS

| | | |
|---|---|---|
| JP | 2008-045974 A | 2/2008 |
| JP | 2009-294842 A | 12/2009 |
| JP | 2010-176669 A | 8/2010 |
| JP | 2010-224936 A | 10/2010 |

* cited by examiner

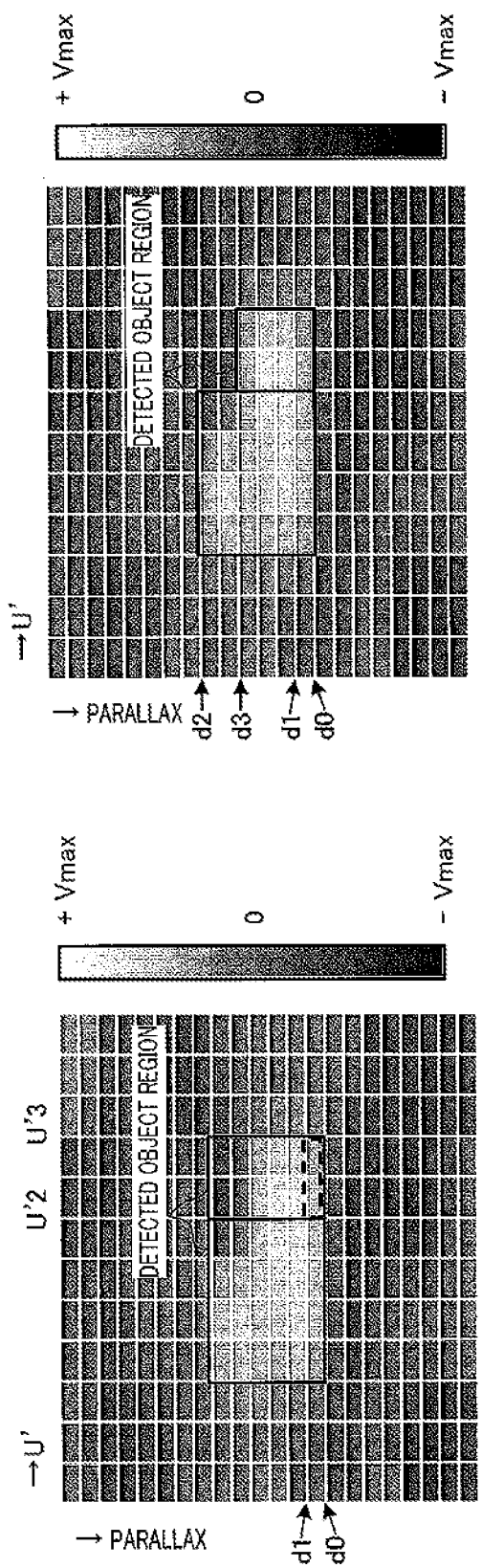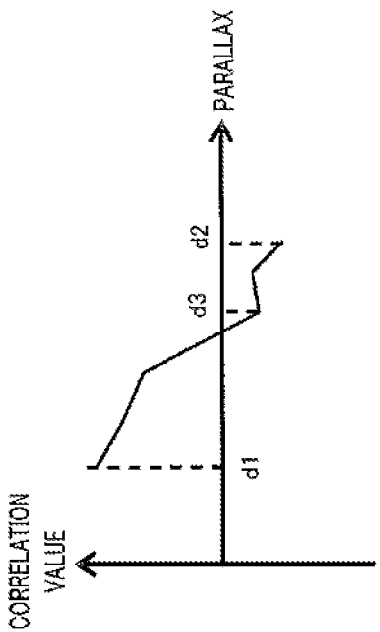
FIG. 15A
FIG. 15B
FIG. 15C

OBJECT DETECTION DEVICE AND OBJECT DETECTION METHOD

TECHNICAL FIELD

The claimed invention relates to object detection apparatuses and object detection methods.

BACKGROUND ART

There has been proposed an object positioning detection apparatus that uses both a millimeter-wave radar and a stereo camera. With object detection apparatuses, in general, the following may occur: being unable to detect an object even though it is located within a detection target area (i.e., non-detection); detecting an object in a detection target area when none is present (i.e., an erroneous detection); or managing to detect an object, but detecting a plurality of objects as a single object (i.e., an erroneous merged detection) or detecting a single object as a plurality of objects (i.e., erroneous separated detections).

In an effort to avoid such detection failures, detection thresholds are adjusted, for example. With millimeter-wave radars, such detection thresholds are set with respect to wave reflection intensity, and with stereo cameras, they are set with respect to parallax extraction amount.

However, while it might be possible to prevent non-detection and erroneous detections through such detection threshold adjustments alone, it would be difficult to completely prevent erroneous merged detections or erroneous separated detections.

With respect to the problem above, Patent literature 1 discloses an object detection apparatus that prevents erroneous separated detections. Specifically, with this object detection apparatus, a set of detection target object candidates is first detected using stereo images taken with a stereo camera. Next, based on the luminance value of each pixel within the respective image regions corresponding to the detection target object candidates, a threshold is altered, the threshold being one that is used in determining whether or not to merge a plurality of detection target object candidates and treat them as one detection target object candidate.

In Patent Literature 2, in order to reduce the incidence of erroneous separated detections and erroneous merged detections, an anticipated detection target object site is used as a criterion for determining whether or not to merge a set of detection target object candidates detected by a millimeter-wave radar and treat them as one detection target object (i.e., it is used as a merge condition).

CITATION LIST

Patent Literature

PTL 1
Japanese Patent Application Laid-Open No. 2010-224936
PTL 2
Japanese Patent Application Laid-Open No. 2005-182137

SUMMARY OF INVENTION

Technical Problem

However, when, as in Patent Literature 1 mentioned above, luminance values are used as a criterion for determining whether or not a plurality of detection target object candidates belong to one object, an erroneous merged detection will occur if there is little difference in luminance value between the detection target object candidates (e.g., if the plurality of detection target object candidates correspond to a plurality of vehicles of the same color, or if the plurality of detection target object candidates correspond to a plurality of people wearing clothes of the same color).

Furthermore, when, as in Patent Literature 2 mentioned above, anticipated detection target object sizes are used as a criterion for determining whether a plurality of detection target object candidates belong to one object or to distinct objects, erroneous separated detections or erroneous merged detections may occur if the detection target objects are in postures that differ from that which is anticipated (e.g., when vehicles are oriented sideways), or if a plurality of small objects are in close proximity to one another (e.g., when a compact car and a motor cycle are traveling alongside each other), and so forth.

An object of the claimed invention is to provide an object detection apparatus and an object detection method that are capable of improving object detection accuracy by preventing erroneous merged detections.

Solution to Problem

An object detection apparatus of an embodiment of the claimed invention includes: a candidate point extraction section that extracts candidate points from camera distance map information in which a set of coordinates in an image plane are mapped to information regarding object presence at each coordinate as obtained based on an image taken with a stereo camera, or from combined map information combining the camera distance map information and radar distance map information in which the set of coordinates in the image plane are mapped to information regarding object presence at each coordinate as obtained based on information detected by a radar, the candidate points being defined by information regarding object presence of a predetermined value or greater and by coordinates mapped to the information regarding object presence of the predetermined value or greater; a setting section that arranges a set of the extracted candidate points into groups based on the information regarding object presence mapped to each candidate point, and that sets up, as a first detected object region, a region in the image plane including all candidate points included in one group; and a correction section that corrects the first detected object region based on travel speed map information in which the set of coordinates in the image plane are mapped to detected travel speeds at respective coordinates as detected by the radar.

An object detection method of an embodiment of the claimed invention includes: extracting candidate points from camera distance map information in which a set of coordinates in an image plane are mapped to information regarding object presence at each coordinate as obtained based on an image taken with a stereo camera, or from combined map information combining the camera distance map information and radar distance nap information in which the set of coordinates in the image plane are mapped to information regarding object presence at each coordinate as obtained based on information detected by a radar, the candidate points being defined by information regarding object presence of a predetermined value or greater and by coordinates mapped to the information regarding object presence of the predetermined value or greater; arranging a set of the extracted candidate points into groups based on the information regarding object presence mapped to each candidate point, and setting up, as a detected object region, a region in the image plane including all candidate points included in one group; and correcting the detected object region based on travel speed map information in which the set of coordinates in the image plane are mapped to detected travel speeds at respective coordinates as detected by the radar.

With the claimed invention, it is possible to provide an object detection apparatus and an object detection method that are capable of improving object detection accuracy by preventing erroneous merged detections.

BRIEF DESCRIPTION OF DRAWINGS

FIGS. 15A through 15C are diagrams illustrating a detected object region correction process;

DESCRIPTION OF EMBODIMENTS

Figure 1:
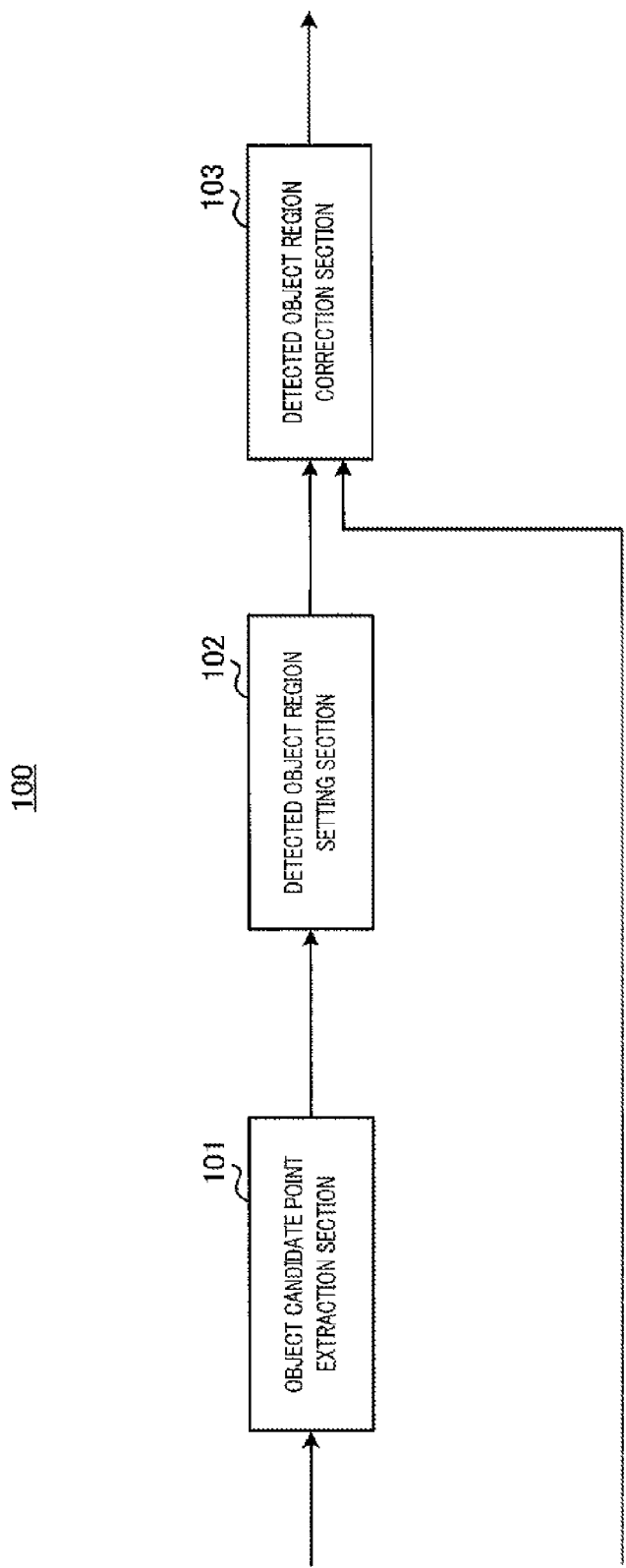
FIG. 1 is a block diagram showing key elements of an object detection processing apparatus according to Embodiment 1 of the claimed invention.

Embodiments of the claimed invention are described in detail below with reference to the drawings. With respect to the embodiments, like elements are designated with like reference numerals, while redundant descriptions thereof are omitted.

[Embodiment 1]

[Key Elements of Object Detection Processing Apparatus]

FIG. 1 shows key elements of object detection processing apparatus 100 according to Embodiment 1 of the claimed invention. With respect to FIG. 1, object detection processing apparatus 100 includes object candidate point extraction section 101, detected object region setting section 102, and detected object region correction section 103.

With respect to object detection processing apparatus 100, object candidate point extraction section 101 extracts candidate points from camera distance map information in which a set of coordinates in a base image plane are mapped to information regarding object presence at each coordinate obtained based on images taken with a stereo camera, the candidate points being defined by information regarding object presence of a predetermined value or greater and by coordinates mapped to the information regarding object presence of the predetermined value or greater. Alternatively, object candidate point extraction section 101 may extract candidate points from combined map information combining camera distance map information and radar distance map information in which a set of coordinates in a base image plane are mapped to information regarding object presence at each coordinate obtained based on information detected by a radar, the candidate points being defined by information regarding object presence of a predetermined value or greater and by coordinates mapped to the information regarding object presence of the predetermined value or greater.

Detected object region setting section 102 arranges sets of candidate points extracted at object candidate point extraction section 101 into groups based on information regarding object presence mapped to each candidate point set, and sets up, as a detected object region, a region in the base image plane including all candidate points included in one group.

Based on travel speed map information in which a set of coordinates in the base image plane is mapped to the detected travel speed at each coordinate detected by a radar, detected object region correction section 103 corrects the detected object region set up by detected object region setting section 102.

The "information regarding object presence" in the context of the camera distance map information may be, for example, parallax values, distance values, or a histogram of parallax values. On the other hand, the "information regarding object presence" in the context of the radar distance map information may be, for example, distance values, or reflected power intensities. Furthermore, the "information regarding object presence" in the context of the combined map information may be combined values computed based on the above-mentioned information regarding object presence in the context of the camera distance map information and the radar distance map information.

[Elements of Object Detection Apparatus]

Figure 2:
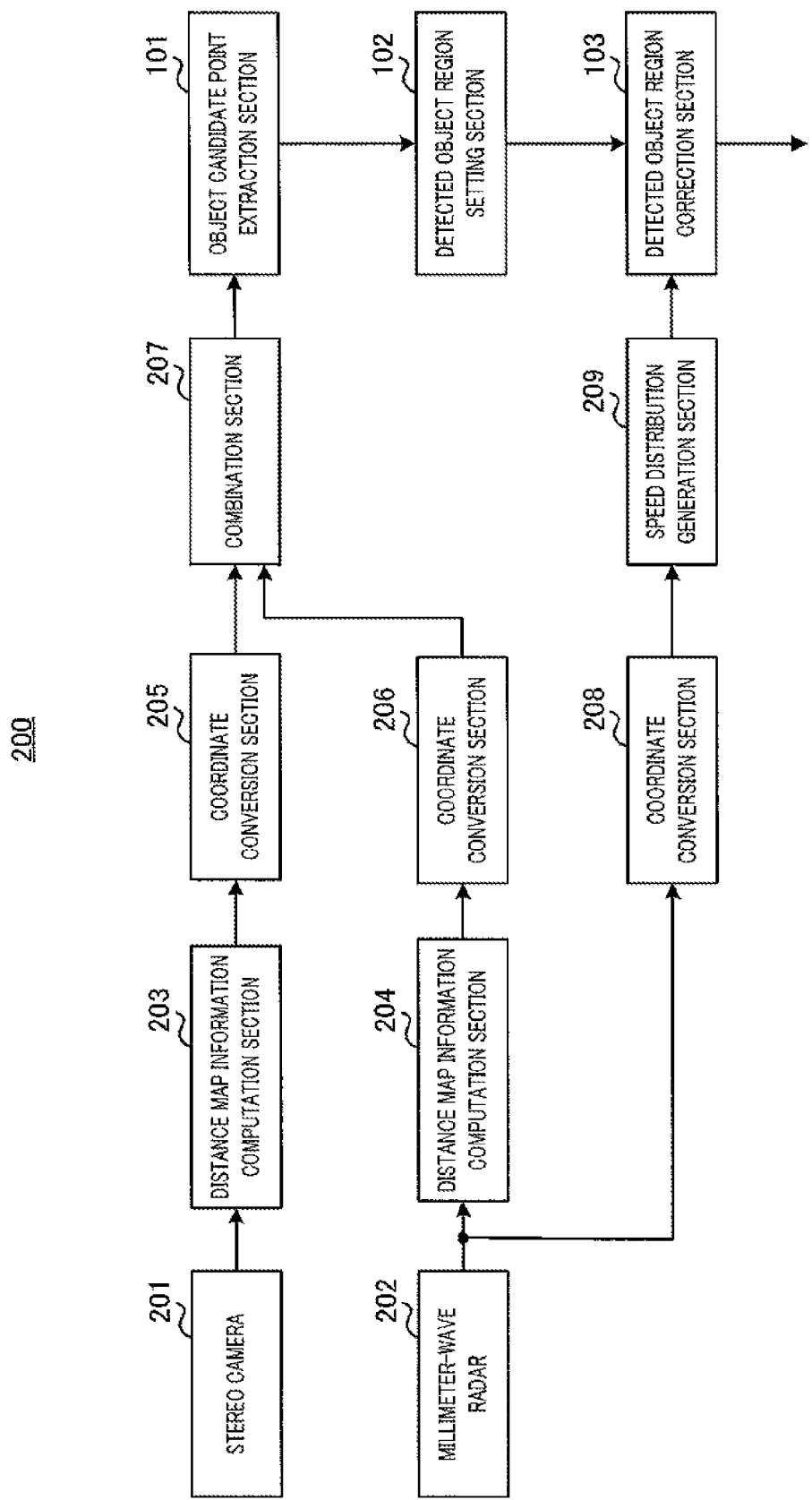
FIG. 2 is a block diagram showing elements of an object detection apparatus according to Embodiment 1 of the claimed invention.

FIG. 2 shows elements of object detection apparatus 200 according to Embodiment 1 of the claimed invention. Object detection apparatus 200 includes object detection processing apparatus 100. With respect to FIG. 2, object detection processing apparatus 100 includes: object candidate point extraction section 101; detected object region setting section 102; detected object region correction section 103; stereo camera 201; millimeter-wave radar 202; distance map information computation sections 203 and 204; coordinate conversion sections 205, 206 and 208; combination section 207; and speed distribution generation section 209. Stereo camera 201 and distance map information computation section 203 form a first positioning system. Millimeter-wave radar 202 and distance map information computation section 204 form a second positioning system.

Stereo camera 201 includes a plurality of cameras, and outputs to distance map information computation section 203 camera images taken with those plurality of cameras (i.e., stereo images).

Figure 3B:
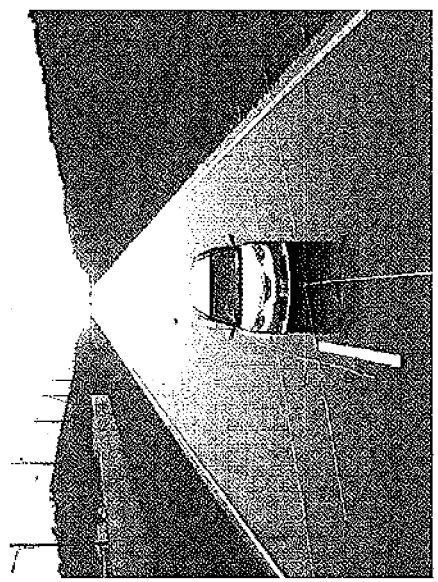
FIGS. 3A and 3B are diagrams showing stereo images.
Figure 3A:
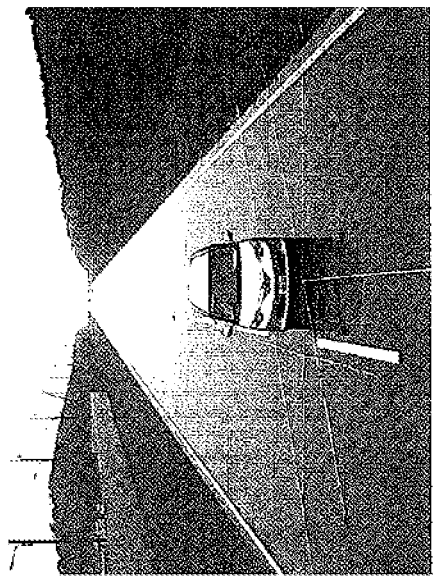

By way of example, stereo camera 201 may include two cameras. These two cameras are disposed in parallel at positions 20 cm apart, for example. Images of a vehicle located at a distance of approximately 20 m taken by stereo camera 201 in such a state are shown in FIGS. 3A and 3B. FIG. 3A shows an image taken by the camera disposed on the left side as viewed in the direction in which the image is taken (i.e., a left camera image). FIG. 3B shows an image taken by the camera disposed on the right side as viewed in the direction in which the image is taken (i.e., a right camera image).

Based on the stereo images outputted from stereo camera 201, distance map information computation section 203 computes camera distance map information. Specifically, based on the disparity between the positions at which the same object appears in the left camera image and the right camera image (i.e., parallax), distance map information computation section 203 computes the separation distance between that object and stereo camera 201 Distance map information computation section 203 computes the camera distance map information by computing such a separation distance with respect to all pixels in the left camera image and the right camera image.

The separation distance between the object of interest and stereo camera 201 may be computed through equation 1 below, for example.

(Equation 1)

$$Z = B \frac{f}{P_x d} \quad [1]$$

where Z is the distance [m] from the stereo camera to the object of interest, B the camera interval [m], f the focal length [m] of the camera, Px the length per pixel [m/pixel] in the horizontal axis direction of the image, and d the parallax [pixels].

More specifically, parallax is computed through the following method, for example. One of the left camera image and the right camera image is taken to be a base image, and the other a reference image. A partial image of a predetermined size (e.g., four pixels by four pixels) is first set up based on the base image (i.e., a partial base image is set up). In addition, a search range of a predetermined size (e.g., on the order of several tens of pixels) is set up within the reference image. Partial reference images of the same size as the partial base image are set up within this search range while gradually shifting their positions. An evaluation function is calculated based on luminance values of the partial base image and each partial reference image. Thus, the partial reference image that corresponds to the partial base image is identified. The disparity between this partial base image and the identified partial reference image corresponds to the parallax.

Since parallax is computed through such a process, parallax that is effective cannot be determined in cases where luminance values vary little in the partial base image and the partial reference images. In other words, it is difficult to obtain parallax with respect to a photographed surface with few patterns on it, e.g., the roof of a vehicle, or a road surface.

Figure 4:
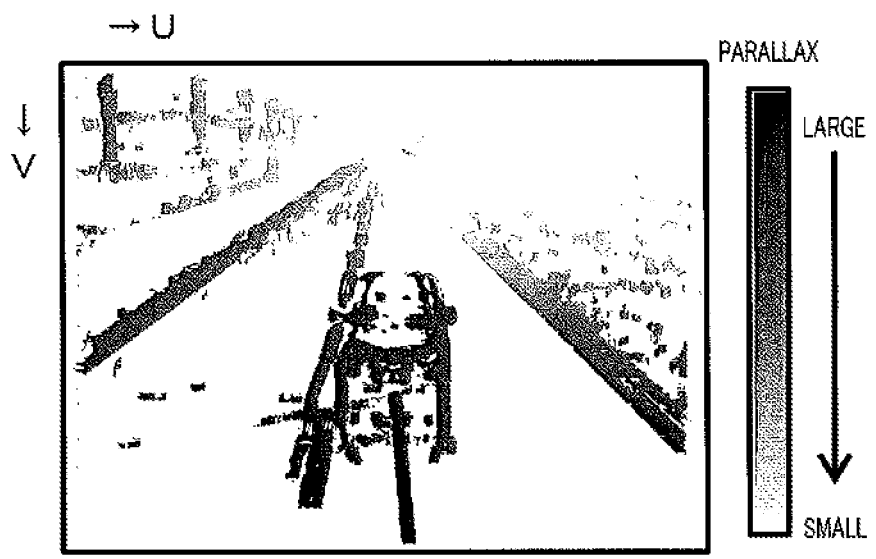
FIG. 4 is a diagram showing an example of camera distance map information.

FIG. 4 shows an example of camera distance map information. The camera distance map information shown in FIG. 4 is derived from the left and right camera images shown in FIGS. 3A and 3B. With respect to FIG. 4, parallax values are used as "information regarding object presence." The magnitude of the parallax is represented by darkness. Since regions for which parallax cannot be determined are given a parallax value of zero, they are shown in white. U and V shown in FIG. 4 indicate image plane coordinates, which are distinguished from real space coordinates (X, Y, Z). In an image plane coordinate system, each coordinate corresponds to a pixel. The horizontal direction of the image is defined as the U coordinate, and the vertical direction of the image as V.

Referring back to FIG. 2, millimeter-wave radar 202 emits a millimeter-wave, and detects the reflection of the emitted millimeter-wave. Millimeter-wave radar 202 then outputs the detection result to distance map information computation section 204.

For millimeter-wave radar 202, for example, the FMCW scheme is applied, and it includes an antenna capable of outputting radio waves of a narrow beam width. Millimeter-wave radar 202 receives reflected waves with that antenna mechanically rotated. With the FMCW scheme, the distance and direction from millimeter-wave radar 202 to the object of interest, the travel speed of the object of interest, and the reflected power intensity from the object of interest may be obtained.

Based on the detection results outputted from millimeter-wave radar 202, distance map information computation section 204 computes radar distance map information. The "travel speed of the object of interest" obtained directly by millimeter-wave radar 202 is a Doppler speed. Specifically, it is a speed with a directionality of from the object of interest towards the installation position of millimeter-wave radar 202.

Figure 5:
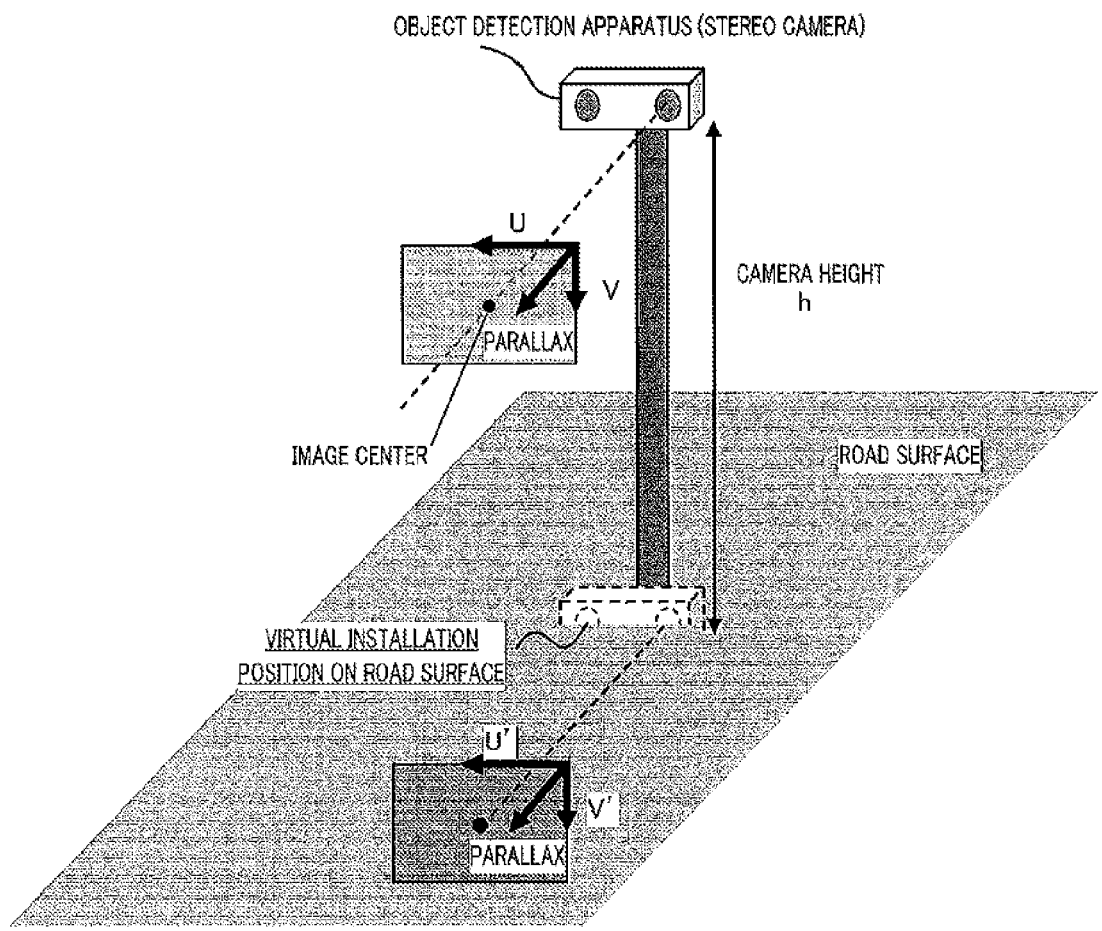
FIG. 5 is a diagram showing an image plane coordinate system (U', V') in a case where a virtual installation position of a detection apparatus is taken to be on a road surface.

Coordinate conversion section 205 aligns the coordinate system of the camera distance map information with a "base coordinate system" by converting the coordinates of the camera distance map information. The "base coordinate system" used at coordinate conversion section 205 is a coordinate system defined by coordinate axis U', which is one of the axes of image plane coordinate system (U', V') where the virtual installation position of object detection apparatus 200 is taken to be on the road surface, and by parallax. Image plane coordinate system (U', V') where the virtual installation position of object detection apparatus 200 is taken to be on the road surface is shown in FIG. 5.

Specifically, coordinate conversion section 205 performs a coordinate conversion process on the camera distance map information through two steps. Details of this process will be described hereinafter.

Coordinate conversion section 206 aligns the coordinate system of the radar distance map information with a "base coordinate system" by converting the coordinates of the radar distance map information. The "base coordinate system" used at coordinate conversion section 206 is also a coordinate system defined by coordinate axis U', which is one of the axes of image plane coordinate system (U', V') where the virtual installation position of object detection apparatus 200 is taken to be on the road surface, and by parallax.

Specifically, coordinate conversion section 206 performs a coordinate conversion process on the radar distance map information through two steps. Details of this process will be described hereinafter.

Combination section 207 generates "combined map information" by combining the camera distance map information that has undergone coordinate conversion at coordinate conversion section 205 with the radar distance map information that has undergone coordinate conversion at coordinate conversion section 206.

Coordinate conversion section 208 converts the travel speed map information obtained directly by millimeter-wave radar 202 into travel speed map information where the virtual installation position of object detection apparatus 200 is taken to be on the road surface. In other words, the basis for the travel speed after conversion is the virtual installation position of object detection apparatus 200. The converted travel speed map information thus obtained by coordinate conversion section 208 is outputted to speed distribution generation section 209.

By correcting the converted travel speed map information received from coordinate conversion section 208, speed distribution generation section 209 generates travel speed map information that matches the camera distance map information, whose coordinates have been converted by coordinate conversion section 205, in resolution.

With respect to the combined map information formed at combination section 207, object candidate point extraction section 101 extracts all coordinates having a predetermined combined value or greater and the combined value of each coordinate, and outputs the extracted information to detected object region setting section 102. These coordinates having a predetermined combined value or greater are referred to as "object candidate points."

Detected object region setting section 102 arranges a set of object candidate points extracted at object candidate point extraction section 101 into groups based on the combined values mapped to the respective object candidate points, thus setting up regions (hereinafter sometimes referred to as "detected object regions") each including a plurality of object candidate points that are arranged into one group.

Detected object region correction section 103 sets up finalized detected object regions by correcting, based on the travel speed map information generated at speed distribution generation section 209, the detected object regions set up at detected object region setting section 102.

Figure 6:
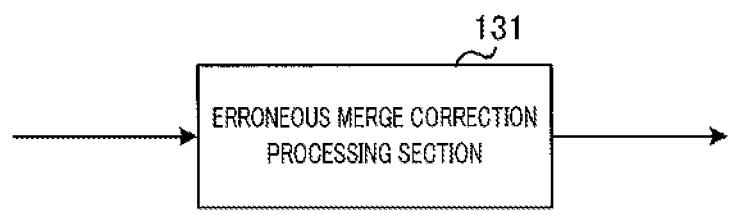
FIG. 6 is a block diagram showing an element of a detected object region correction section with respect to Embodiment 1.

Specifically, detected object region correction section 103 with respect to Embodiment 1 includes erroneous merge correction processing section 131 as shown in FIG. 6. Erroneous merge correction processing section 131 divides corresponding regions in the travel speed map information generated at speed distribution generation section 209, which correspond to the detected object regions set up at detected object region setting section 102, into a plurality of partial regions each having the same size in the U'-axis direction. Erroneous merge correction processing section 131 computes, with respect to speed, the correlation value between a representative partial region among those plurality of partial regions and each partial region other than the representative partial region. Erroneous merge correction processing section 131 sets up finalized detected object regions by correcting, based on the distribution of the computed correlation values, the detected object regions set up at detected object region setting section 102.

[Operations of Object Detection Apparatus 200]

Operations of object detection apparatus 200 including the elements above will now be described.

<Coordinate Conversion Process 1>

Coordinate conversion section 205 aligns the coordinate system of the camera distance map information with a "base coordinate system" by converting the coordinates of the camera distance map information. The "base coordinate system" used at coordinate conversion section 205 is a coordinate system defined by coordinate axis U', which is one of the axes of image plane coordinate system (U', V') where the virtual installation position of object detection apparatus 200 is taken to be on the road surface, and by parallax.

Specifically, coordinate conversion section 205 performs a coordinate conversion process on the camera distance map information through the following two steps.

(1) Coordinate conversion section 205 performs coordinate conversion by projecting onto image plane coordinates (U', V') the camera distance map information within image plane coordinates (U, V) (see FIG. 7A), which is obtained using an image taken from the actual position at which object detection apparatus 200 is installed.

Specifically, assuming that vector $\hat{u}$ of a coordinate point before coordinate conversion is (u, v, 1, d), and that vector $\hat{u}'$ of a coordinate point after coordinate conversion is (u', v', 1, d'), then the relationship $\hat{u}'=S^{-1}DS\hat{u}$ holds. Here, D represents a conversion matrix including installation parameters (e.g., installation height, rotation angle) of the stereo camera, and S represents a matrix of camera correction parameters (e.g., camera interval, focal length).

Figure 7B:
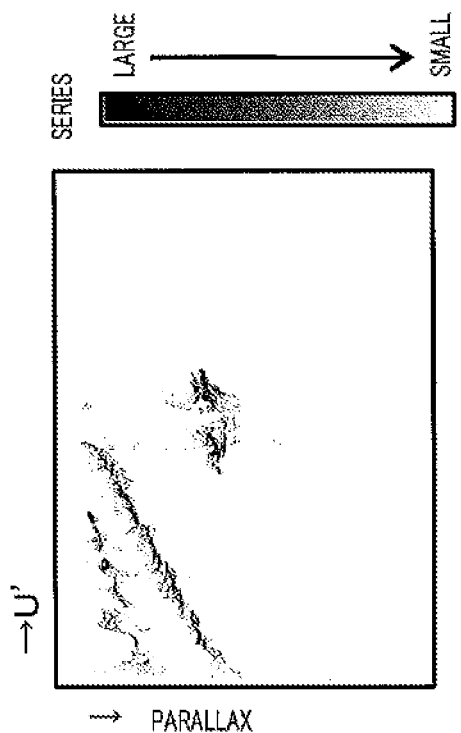
FIGS. 7A and 7B are diagrams illustrating a coordinate conversion process.
Figure 7A:
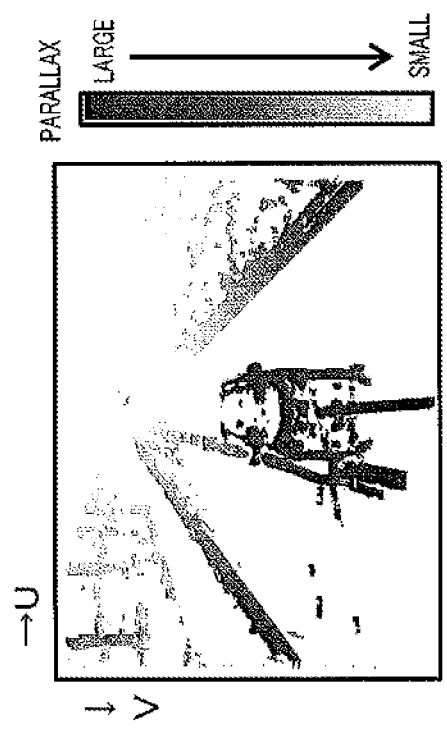

(2) Based on the camera distance map information of image plane coordinate system (U', V'), coordinate conversion section 205 computes a V'-direction parallax histogram with respect to U' coordinates. In particular, coordinate conversion section 205 computes a parallax histogram by restricting the range of V' coordinates to parts corresponding to the image above the road surface. A process of converting the coordinates of the camera distance map information to the "base coordinate system" is thus carried out. An example of camera distance map information that has undergone coordinate conversion to the "base coordinate system" is shown in FIG. 7B.

Assuming that parallax with respect to (u', v') coordinates is d(u', v'), and that a series with respect to (u', d) coordinates is N(u', d), then the conversion from d(u', v') to N(u', d) is represented as follows.

$$\text{for } (i=0; i<n, i++)\{\text{for } (j=0; j<m; j++)\{N(i, d(i,j))++;\}\}$$

where n and m denote the range of the U' coordinates and the range of the V' coordinates, respectively.

<Coordinate Conversion Process 2>

Coordinate conversion section 206 aligns the coordinate system of the radar distance map information with a "base coordinate system" by converting the coordinates of the radar distance map information. The "base coordinate system" used at coordinate conversion section 206 is also a coordinate system defined by coordinate axis U', which is one of the axes of image plane coordinate system (U', V') where the virtual installation position of object detection apparatus 200 is taken to be on the road surface, and by parallax.

Specifically, coordinate, conversion section 206 performs a coordinate conversion process on the radar distance map information through the following two steps.

Figure 8B:
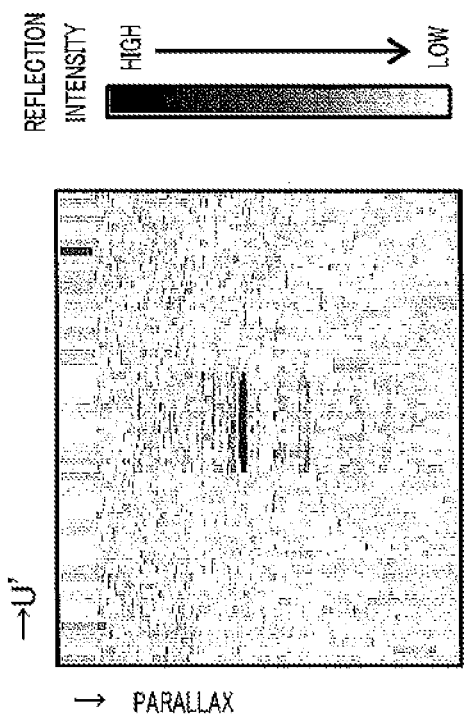
FIGS. 8A and 8B are diagrams illustrating a coordinate conversion process.
Figure 8A:
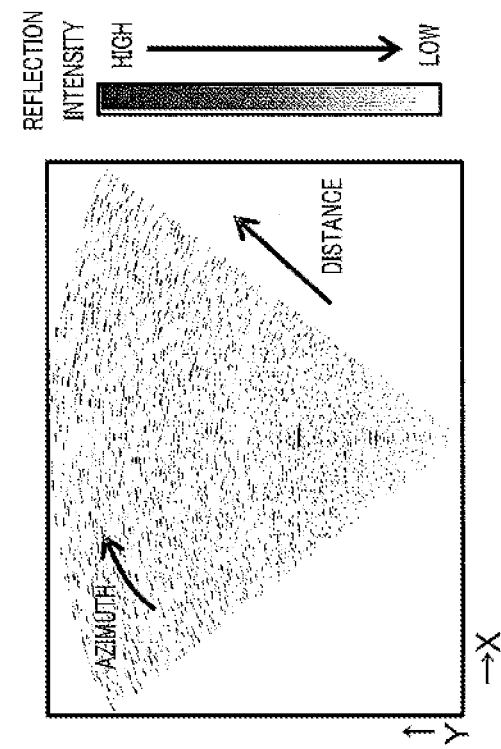

(1) Coordinate conversion section 206 performs coordinate conversion by projecting onto a plane that is parallel to the installation plane of object detection apparatus 200 (including the installation plane of object detection apparatus 200) radar distance map information in which each direction (i.e., a direction identified by an azimuth and depression pair) is mapped to "information regarding object presence" for each direction. An example of radar distance map information that has undergone such coordinate conversion is shown in FIG. 8A.

(2) Coordinate conversion section 206 computes a reflected power intensity distribution with respect to each of the U', parallax coordinates based on the radar distance map information projected onto the plane parallel to the installation plane of object detection apparatus 200. A process of converting the coordinates of the radar distance map information to the "base coordinate system" is thus carried out. An example of radar distance map information that has undergone coordinate conversion to the "base coordinate system" is shown in FIG. 8B.

Assuming that the installation position and angle of stereo camera 201 coincide with the installation position and angle of millimeter-wave radar 202, the process of computing a reflected power intensity distribution by coordinate conversion section 206 may be represented as follows using camera correction parameter matrix S mentioned above.

$$p^{\wedge\prime}=S^{-1}p^{\wedge}$$

where vector $p^{\wedge}=(x, 0, z, 1)$ represents coordinates (x, z) in a plane parallel to the installation plane of object detection apparatus 200, and vector $p^{\wedge\prime}=(u', 0, 1, d)$ represents coordinates (u', d) in a plane defined by U' and parallax.

<Distance Map Information Combination Process>

Combination section 207 combines the camera distance map information and the radar distance map information by computing the geometric mean of the "information regarding object presence" at corresponding coordinates between the radar distance map information and the camera distance map information. "Combined map information" is thus generated. The radar distance map information and the camera distance map information may be put through a normalization process before the combination process. This normalization process is carried out by taking the greatest value among the level values respectively mapped to the set of (U', parallax) coordinates included in the radar distance map information (or the camera distance map information), and dividing the other level values thereby.

<Coordinate Conversion Process 3>

Coordinate conversion section 208 converts the travel speed map information obtained directly by millimeter-wave radar 202 into travel speed map information where the virtual installation position of object detection apparatus 200 is taken to be on the road surface. In other words, the basis for the travel speed after conversion is the virtual installation position of object detection apparatus 200. This coordinate conversion is performed using equation 2 below, for example.

[2]

$$v'=v/\cos(\arcsin(h/d)) \quad \text{(Equation 2)}$$

With respect to equation 2, h denotes the height of the installation position of millimeter-wave radar 202, d the detected distance of the object of interest, v the travel speed in relation to the direction connecting the object of interest and the installation position of millimeter-wave radar 202, and v' the travel speed where the virtual installation position of object detection apparatus 200 is taken to be on the road surface. In other words, the travel speed map information obtained at coordinate conversion section 208 is expressed in terms of image plane coordinates (U', V'). This converted travel speed map information obtained by coordinate conversion section 208 is outputted to speed distribution generation section 209.

<Speed Distribution Generation Process>

By correcting the travel speed map information received from coordinate conversion section 208, speed distribution generation section 209 generates travel speed map information that matches the camera distance map information, whose coordinates have been converted by coordinate conversion section 205, in resolution.

Figures 9A, 9B:
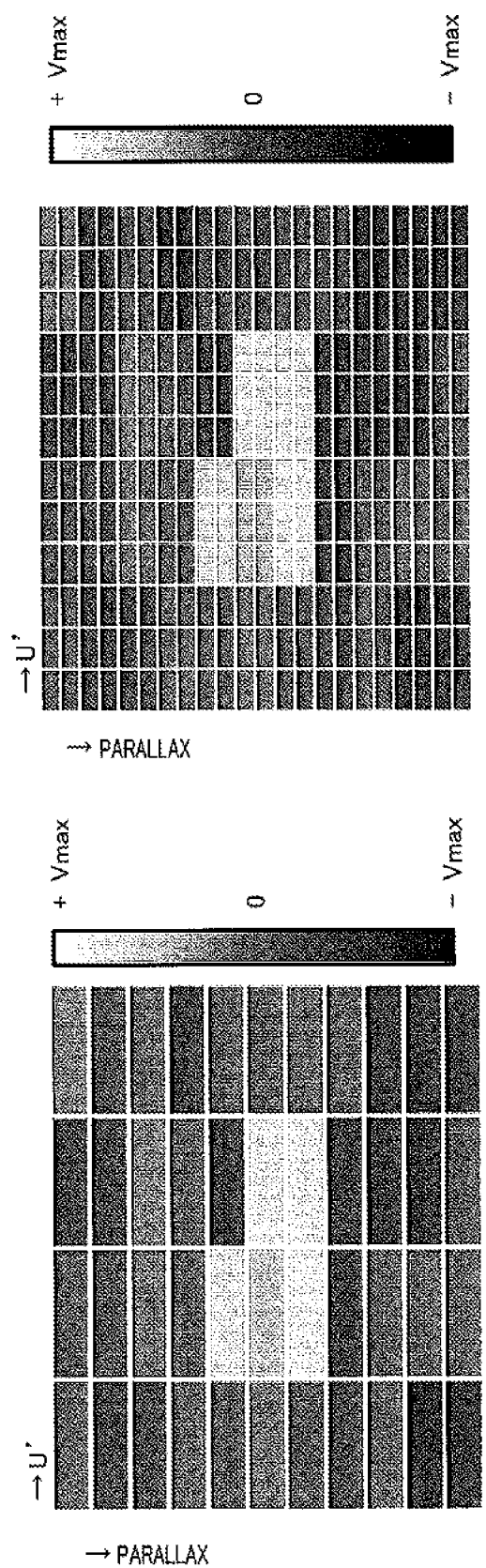
FIGS. 9A and 9B are diagrams illustrating a speed distribution generation process.

FIGS. 9A and 9B are diagrams illustrating a speed distribution generation process. FIG. 9A is a diagram showing the travel speed map information received from coordinate conversion section 208. In FIG. 9A, the magnitude of the speed in the direction away from the radar (in the direction in which parallax increases) is represented by darkness. FIG. 9B is a diagram showing travel speed map information that matches the camera distance map information in resolution. In other words, the resolution of FIG. 9B is greater than the resolution of FIG. 9A.

<Object Candidate Point Extraction Process>

With respect to the combined map information formed at combination section 207, object candidate point extraction section 101 extracts all coordinates having a predetermined combined value or greater and the combined value of each coordinate, and outputs the extracted information to detected object region setting section 102.

<Detected Object Region Setting Process>

Detected object region setting section 102 arranges a set of object candidate points extracted at object candidate point extraction section 101 into groups based on the combined values mapped to the respective object candidate points, thus setting up regions (i.e., "detected object regions") each including a plurality of object candidate points that are arranged into one group.

Figure 10B:
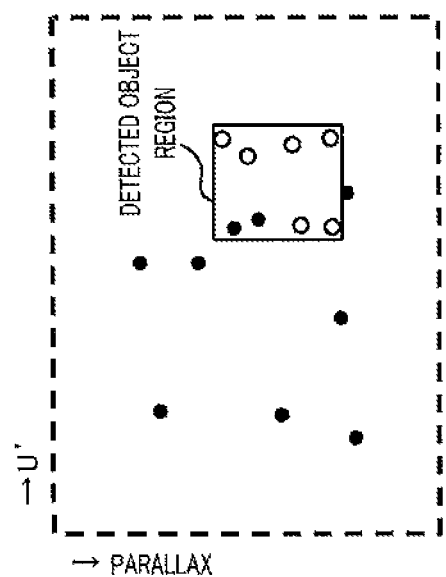
FIGS. 10A and 10B are diagrams illustrating a detected object region setting process.
Figure 10A:
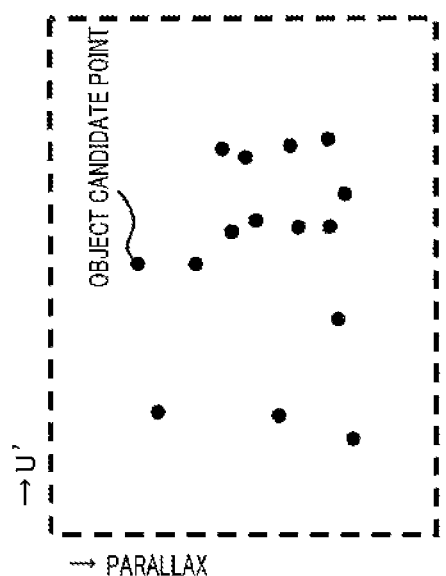

FIGS. 10A and 10B are diagrams illustrating a detected object region setting process. FIG. 10A shows a set of object candidate points extracted at object candidate point extraction section 101. Each object candidate point is mapped to its coordinates and combined value.

Using the following conditions, detected object region setting section 102 labels the set of object candidate points.

(Condition 1) A first type of label is assigned to object candidate points located within a range of predefined distance D from a given object candidate point.

(Condition 2) The average of the combined values of the set of object candidate points to which the first type of label has been assigned under Condition 1 is computed. Of the set of object candidate points to which the first label has been assigned under Condition 1, object candidate points that have a combined value whose difference relative to the computed average falls within a range of predefined value P are assigned a second type of label that differs from the first type of label.

Detected object region setting section 102 generates a rectangle including all of the set of object candidate points to which the second type of label has been assigned (i.e., it generates a detected object region candidate), and sets up a detected object region defined by the detected object region candidate. However, if another detected object region candidate exists inside of the detected object region candidate being generated, a rectangle that excludes that detected object region candidate is generated. For the object candidate points that did not fit into the generated detected object region candidate, the labeling process is repeated from Condition 1.

FIG. 10B shows a detected object region that has been set up through the process above. The white dots in FIG. 10B are examples of object candidate points to which the second type of label has been assigned under Condition 2, and the rectangle including those points is a detected object region.

<Detected Object Region Correction Process>

Detected object region correction section 103 sets up finalized detected object regions by correcting, based on the travel speed map information generated at speed distribution generation section 209, the detected object regions set up at detected object region setting section 102. In embodiment 1, an erroneous merge correction process is performed as detected object region correction.

Erroneous merge correction processing section 131 of detected object region correction section 103 divides corresponding regions in the travel speed map information generated at speed distribution generation section 209, which correspond to the detected object regions set up at detected object region setting section 102, into a plurality of partial regions each having the same size in the U'-axis direction. Erroneous merge correction processing section 131 computes, with respect to speed, the correlation value between a representative partial region among those plurality of partial regions and each partial region other than the representative partial region. In other words, since a data sequence including speed values corresponding to (U', parallax) coordinates is obtained from each partial region (in particular, a data sequence corresponding to the representative partial region may sometimes be referred to as a "sample speed distribution" hereinafter), correlation values with respect to speed can be determined by computing correlation values of the data sequences with respect to one another. Erroneous merge correction processing section 131 sets up finalized detected object regions by correcting, based on the distribution of the computed correlation values, the detected object regions set up at detected object region setting section 102.

Figure 11D:
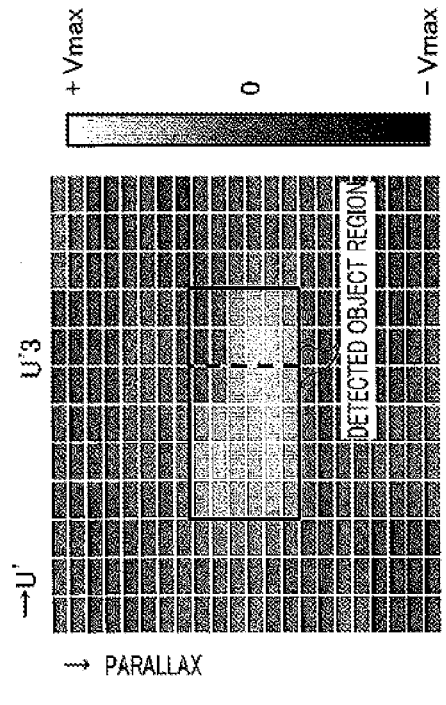
FIGS. 11A through 11D are diagrams illustrating a detected object region correction process.
Figure 11C:
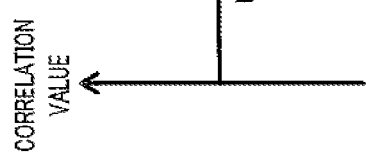
Figure 11A:
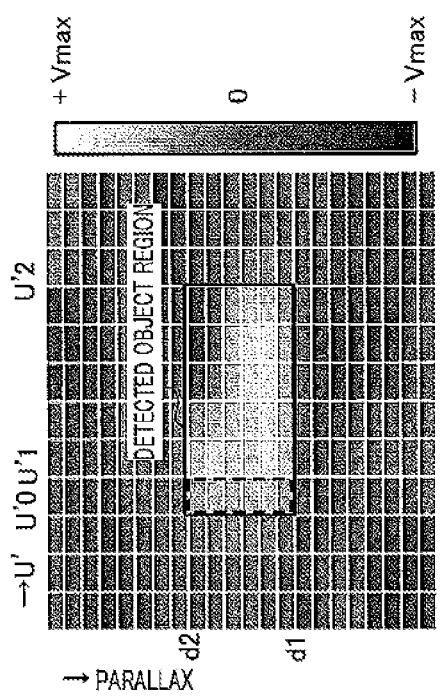

FIGS. 11A through 11D are diagrams illustrating a detected object region correction process. FIG. 11A shows an example of a detected object region set up by detected object region setting section 102. Erroneous merge correction processing section 131 divides the set up detected object region into a plurality of partial regions by their U' coordinates. In the case at hand, erroneous merge correction processing section 131 selects the partial region with the smallest U' coordinate (i.e., the partial region whose U' coordinate is U'0) as a representative partial region.

Figure 11B:
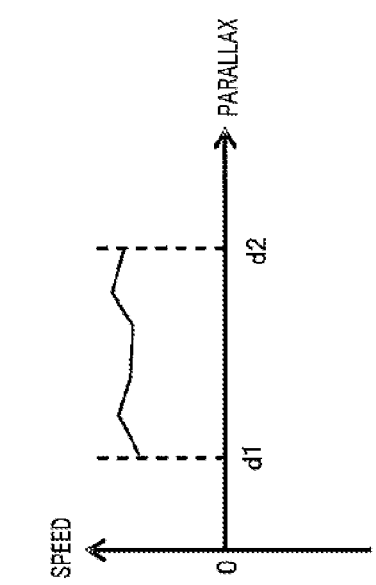

An example of a sample speed distribution corresponding to this representative partial region is shown in FIG. 11B. Erroneous merge correction processing section 131 computes the correlation value between the sample speed distribution and each of the speed distributions corresponding to the respective partial regions other than the representative partial region. Assuming that the sample speed distribution is (U'=U'0) and that the speed distribution at another U' coordinate is (U'=x), then correlation value z(U'0, x) between the two distributions is computed through equation 3 below.

(Equation 3)

$$z(U'0, x) = \sum_{d=d1}^{d2} v(U'0, d) \cdot v(x, d)$$ [3]

where, with respect to equation 3, v(U', d) is a speed value corresponding to (U', d) coordinates.

If the distribution pattern of the computed correlation values satisfies a division condition, erroneous merge correction processing section 131 divides the detected object region that has been set up at detected object region setting section 102.

FIG. 11C shows a correlation value distribution in which correlation values computed with respect to each of the partial regions other than the representative partial region are plotted against the parallax axis. In the correlation value distribution shown in FIG. 11C, the correlation value changes significantly at U'3. When the correlation value distribution exhibits such a pattern, erroneous merge correction processing section 131 divides the single detected object region set up at detected object region setting section 102 into two detected object regions bounded at U'3. FIG. 11D shows an example of two divided detected object regions. In Embodiment 1, these two detected object regions serve as finalized detected object regions.

The reason for performing such a division process is that, when the correlation value changes significantly at some point, this may be understood to mean that, due to an erroneous merge at detected object region setting section 102, a plurality of objects have been detected as one and the same object, and that there lies a boundary between the objects at the coordinate at which the correlation value changes significantly.

The finalized detected object regions thus set up (i.e., the object detection results) may be, for example, outputted to a display apparatus (not shown) and displayed in a superimposed manner over the right image (or the left image), or they may be outputted to and utilized at a control apparatus (not shown) such as a traffic signal control apparatus, and/or the like.

Thus, with the present embodiment, at object detection apparatus 200, detected object region correction section 103 corrects detected object region(s) set up by detected object region setting section 102 based on travel speed map information in which a set of coordinates in a base image plane are mapped to detected travel speeds detected by a radar at respective coordinates.

Thus, even if the detected object region is obtained as a result of an erroneous merge, that detected object region may be corrected using the travel speed map information. Consequently, object detection accuracy may be improved.

In the description above, a plurality of partial regions are formed by dividing, in the direction of the U' coordinates, a detected object region set up at detected object region setting section 102. However, this is by no means limiting, and they may also be formed through division in the parallax axis direction. In essence, erroneous merge correction processing section 131 need only be able to divide a detected object region set up at detected object region setting section 102 based on inter-partial region correlation values among a plurality of partial regions obtained by dividing, in the same size along the U'-axis direction or the parallax axis direction, a region of travel speed map information corresponding to the detected object region set up at detected object region setting section 102.

[Embodiment 2]

In Embodiment 2, a filtering process is performed in advance on travel speed map information that is to be used for a detected object region correction process.

Figure 12:
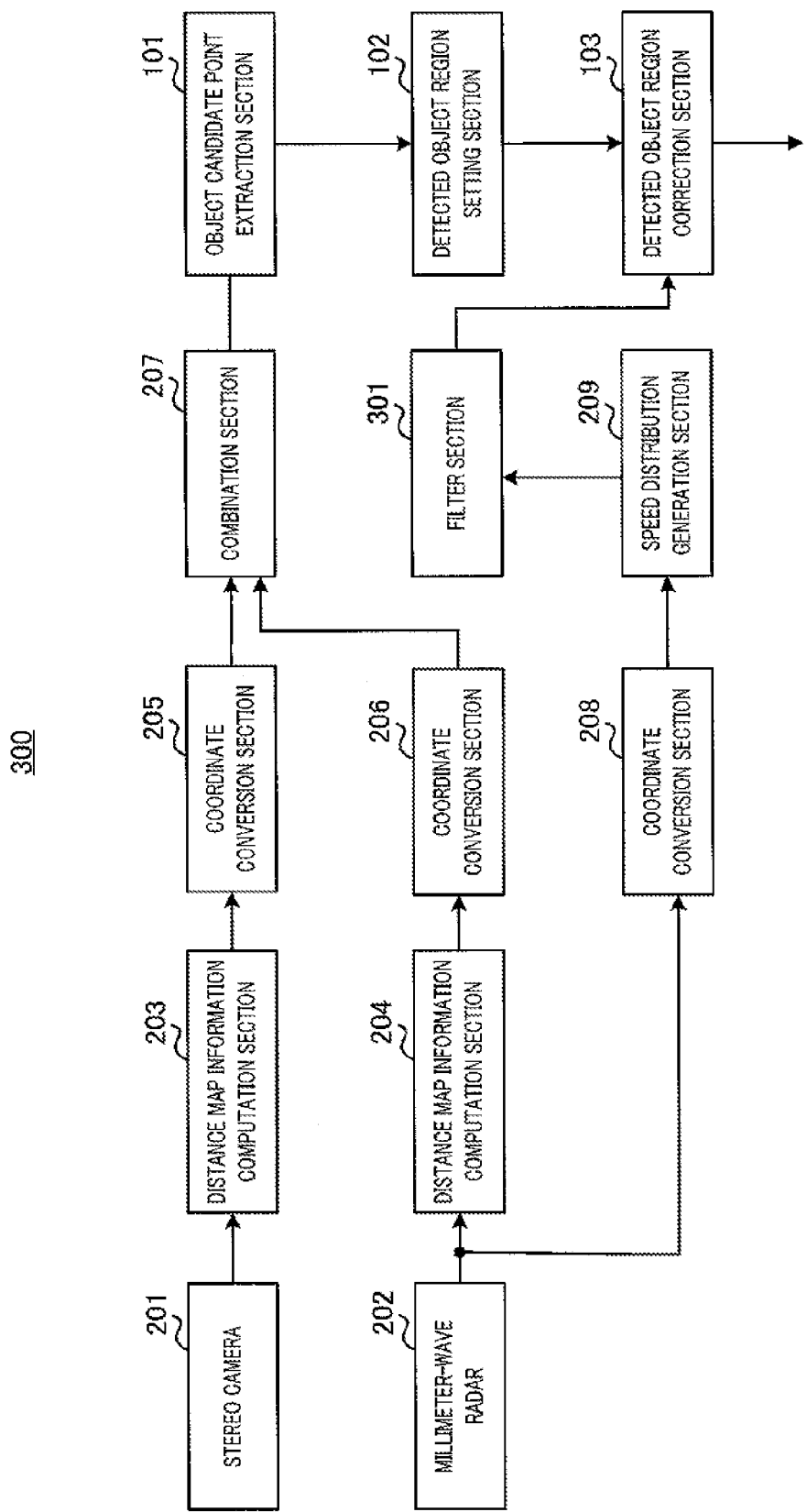
FIG. 12 is a block diagram showing elements of an object detection apparatus according to Embodiment 2 of the claimed invention.

FIG. 12 shows elements of object detection apparatus 300 according to Embodiment 2 of the claimed invention. With respect to FIG. 12, object detection apparatus 300 includes filter section 301.

Figure 13:
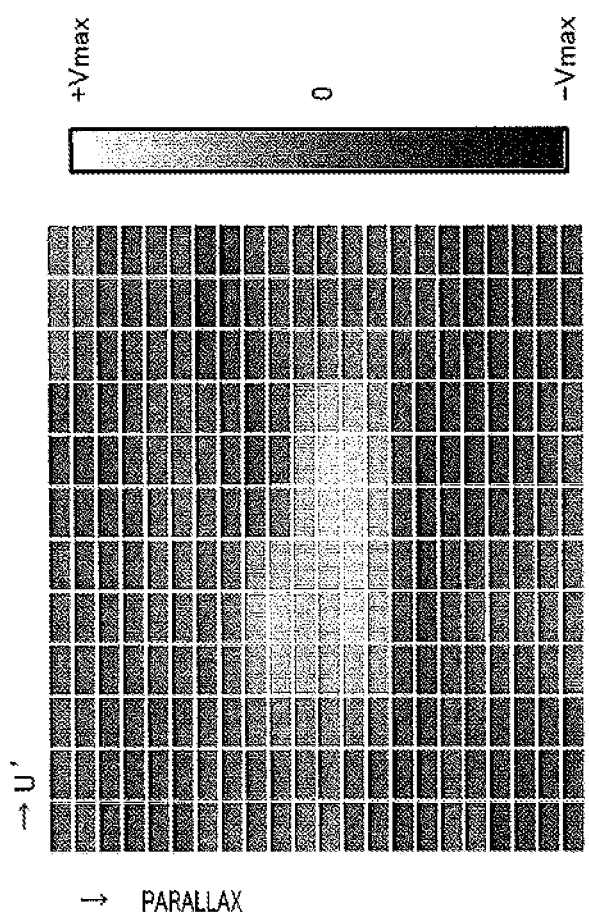
FIG. 13 is a diagram showing an example of travel speed map information after a smoothing process.

Filter section 301 performs a smoothing process on the travel speed map information generated by speed distribution generation section 209. This smoothes the speed value distribution of the travel speed map information in the (U', parallax) plane. FIG. 13 shows an example of travel speed map information after a smoothing process.

The resolution of distance map information generated by a stereo camera is generally higher than the resolution of distance map information generated by a millimeter-wave radar. Accordingly, the distribution of travel speed map information obtained at coordinate conversion section 208 tends to be coarser than the distribution of camera distance map information obtained at coordinate conversion section 205. As such, the speed value distribution of the travel speed map information in the (U', parallax) plane is smoothed by performing a smoothing process on the travel speed map information generated at speed distribution generation section 209. Thus, in the subsequent detected object region correction process, the resolution of region length correction may be enhanced, for example, thereby enabling more accurate detected object region correction.

[Embodiment 3]

In Embodiment 3, in addition to an erroneous merge correction process, a detected length correction process is performed as a detected object region correction process. Processes described in connection with Embodiment 3 are applicable to both Embodiment 1 and Embodiment 2. Basic elements of an object detection apparatus according to Embodiment 3 are similar to those of object detection apparatus 200 according to Embodiment 1. As such, a description will be provided with reference to FIG. 2.

Figure 14:
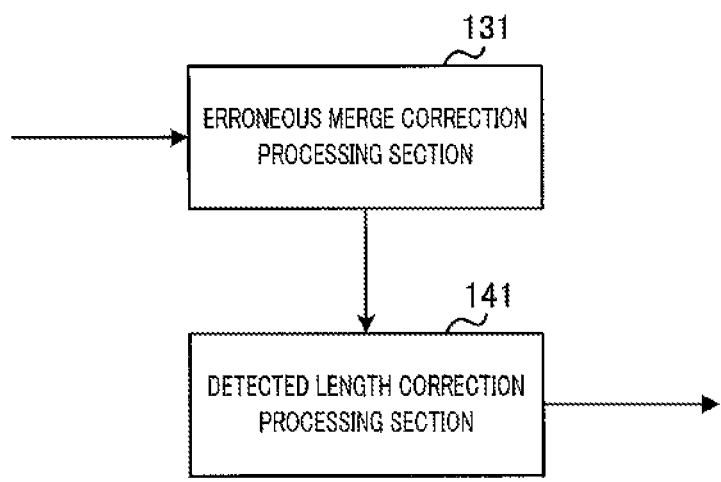
FIG. 14 is a block diagram showing elements of a detected object region correction section according to Embodiment 3 of the claimed invention.

As shown in FIG. 14, detected object region correction section 103 of object detection apparatus 200 with respect to Embodiment 3 includes erroneous merge correction processing section 131 and detected length correction processing section 141.

Detected length correction processing section 141 performs generally the same processes as erroneous merge correction processing section 131 on each of a plurality of detected object regions divided at erroneous merge correction processing section 131. In other words, detected length correction processing section 141 divides, along the U'-axis direction or the parallax axis direction and into a plurality of partial regions having the same size, a corresponding region of the travel speed map information generated at speed distribution generation section 209 corresponding to the detected object region set up at erroneous merge correction processing section 131.

However, detected length correction processing section 141 performs this division in a direction that differs from that of the division by erroneous merge correction processing section 131. In other words, if division is carried out in the U'-axis direction at erroneous merge correction processing section 131, detected length correction processing section 141 performs division in the parallax axis direction. If division is carried out in the parallax axis direction at erroneous merge correction processing section 131, detected length correction processing section 141 performs division in the U'-axis direction. A description is provided below with respect to a case where detected length correction processing section 141 performs division in the parallax axis direction.

Detected length correction processing section 141 computes, with respect to speed, the correlation value between a representative partial region among those plurality of partial regions and each partial region other than the representative partial region. In other words, since a data sequence including speed values corresponding to (U', parallax) coordinates (i.e., a "sample speed distribution") is obtained from each partial region, correlation values with respect to speed can be determined by computing correlation values of the data sequences with respect to one another.

Detected length correction processing section 141 sets up finalized detected object regions by correcting, based on the distribution of the computed correlation values, the detected object regions set up at detected object region setting section 102.

FIGS. 15A through 15C are diagrams illustrating a detected object region correction process. FIG. 15A shows an example of two detected object regions set up at erroneous merge correction processing section 131.

Detected length correction processing section 141 divides the set up detected object regions into a plurality of partial regions by their parallax coordinates. In the case at hand, detected length correction processing section 141 selects the partial region with the greatest parallax coordinate (i.e., the partial region whose parallax coordinate is d0) as a representative partial region. Detected length correction processing section 141 computes the correlation value between the sample speed distribution (not shown) corresponding to this representative partial region and each of the speed distributions corresponding to the respective partial regions other than the representative partial region. Assuming that parallax d of the sample speed distribution is d0, and that the parallax of a speed distribution at another parallax coordinate is d=x, then correlation value z(d0, x) between the two distributions is computed through equation 4 below.

(Equation 4)

$$z(d0, x) = \sum_{U'=U'_2}^{U'_3} v(U', d0) \cdot v(U', x) \quad [4]$$

where, with respect to equation 4, v(U', d) is a speed value corresponding to (U', d) coordinates.

If the distribution pattern of the computed correlation values satisfies a division condition, detected length correction processing section 141 divides the detected object region that has been set up at erroneous merge correction processing section 131. FIG. 15B shows a correlation value distribution in which correlation values computed with respect to each of the partial regions other than the representative partial region are plotted against the parallax axis. In the correlation value distribution shown in FIG. 15B, the correlation value changes significantly at d3. When the correlation value distribution exhibits such a pattern, detected length correction processing section 141 divides one detected object region set up at erroneous merge correction processing section 131 into two detected object regions bounded at d3. FIG. 15C shows an example of two divided detected object regions.

However, unlike erroneous merge correction processing section 131, detected length correction processing section 141 sets up, from among these two detected object regions and as a finalized detected object region, only the detected object region including the representative partial region.

Through the process elements above, the present object detection apparatus is able to correct the size of the detected object region. Thus, a detected object region better reflecting the actual size of the detection target object may be generated.

[Embodiment 4]

In Embodiment 4, in addition to an erroneous merge correction process, an erroneous separation correction process is performed as a detected object region correction process. Processes described in connection with Embodiment 4 are applicable to both Embodiment 1 and Embodiment 2. Basic elements of an object detection apparatus according to Embodiment 4 are similar to those of object detection apparatus 200 according to Embodiment 1. As such, a description will be provided with reference to FIG. 2.

Figure 16:
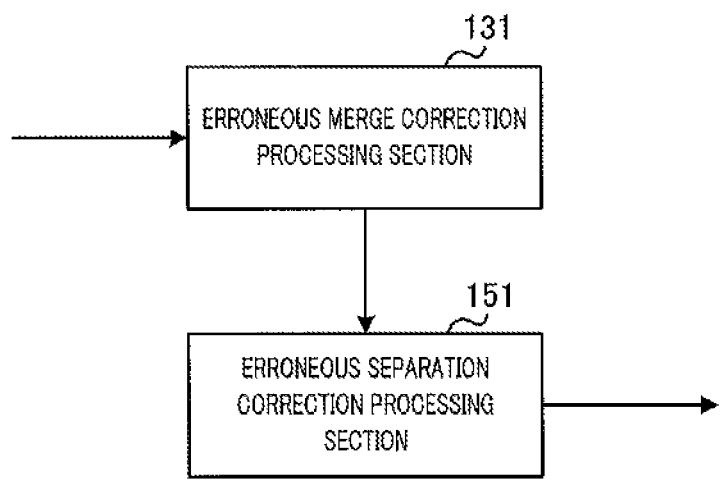
FIG. 16 is a block diagram showing elements of a detected object region correction section according to Embodiment 4 of the claimed invention.

As shown in FIG. 16, detected object region correction section 103 of object detection apparatus 200 with respect to Embodiment 4 includes erroneous merge correction processing section 131 and erroneous separation correction processing section 151.

Erroneous separation correction processing section 151 computes an average speed distribution with respect to each of a plurality of detected object regions that are subject to processing. These plurality of detected object regions subject to processing include detected object regions that have been set up at detected object region setting section 102 but have not been divided at erroneous merge correction processing section 131, or detected object regions set up at erroneous merge correction processing section 131. Erroneous separation correction processing section 151 computes an average speed distribution by computing the average of speed values in the U'-axis direction or the parallax axis direction with respect to each detected object region subject to processing.

By way of example, with respect to a detected object region subject to processing, erroneous separation correction processing section 151 computes an average value corresponding to one U'-axis coordinate by averaging a plurality of speed values corresponding to a plurality of coordinates sharing the same U'-axis coordinate while having different parallax coordinates. Erroneous separation correction processing section 151 computes average values for all U'-axis coordinates with respect to the detected object region subject to processing. Thus, erroneous separation correction processing section 151 computes a data sequence including a speed average for each U' coordinate with respect to the detected object region subject to processing (i.e., it computes an "average speed distribution").

Erroneous separation correction processing section 151 computes correlation values among average speed distributions respectively computed for a plurality of detected object regions subject to processing.

If a computed correlation value exceeds a merge base threshold, erroneous separation correction processing section 151 sets up, as one detected object region, a rectangular region including the two detected object regions corresponding to the two average speed distributions that were used to compute that correlation value.

Figure 17A:
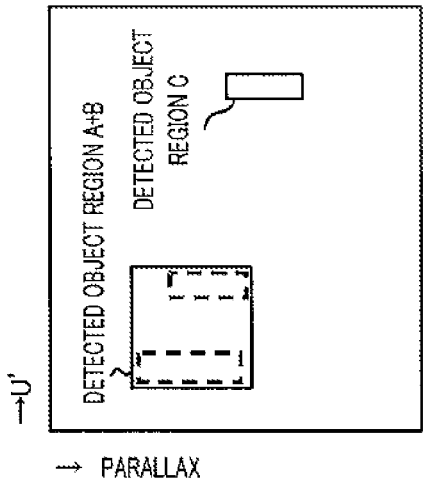
FIGS. 17A through 17C are diagrams illustrating a detected object region correction process.
Figure 17C:
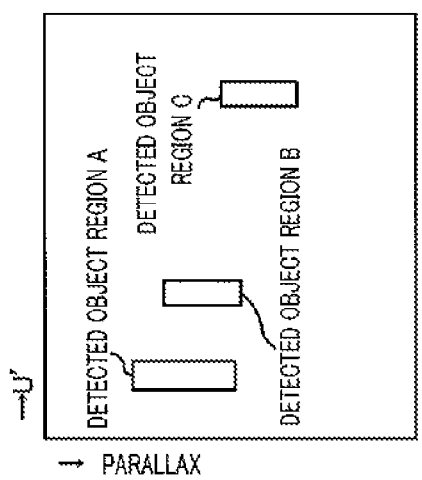
Figure 17B:
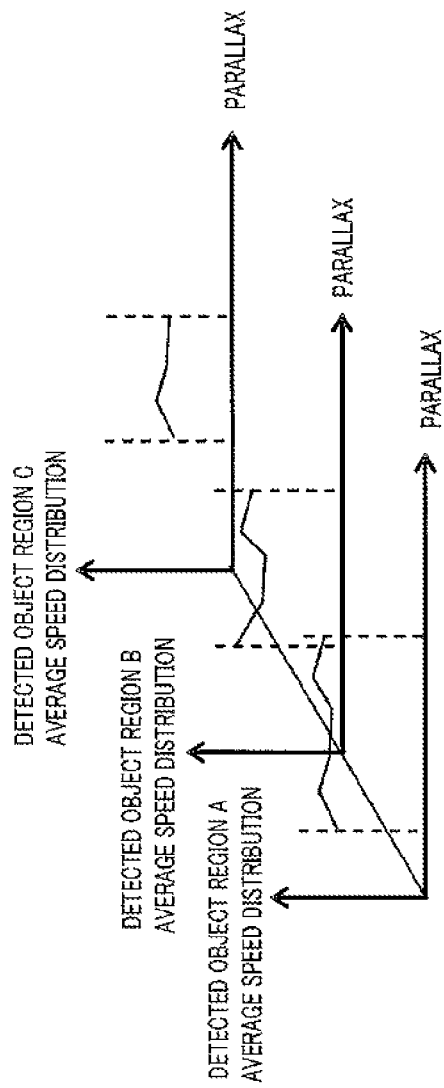

FIGS. 17A through 17C are diagrams illustrating a detected object region correction process. FIG. 17A shows three detected object regions (A through C) subject to processing. Erroneous separation correction processing section 151 computes an average speed distribution for each of detected object regions A through C, FIG. 17B shows an example of average speed distributions respectively computed for detected object regions A through C. Erroneous separation correction processing section 151 computes correlation values among the average speed distributions respectively computed for detected object regions A through C. If a given computed correlation value exceeds the merge base threshold, erroneous separation correction processing section 151 sets up, as one detected object region, a rectangular region including the two detected object regions corresponding to the two average speed distributions that were used to compute that correlation value. FIG. 17C shows a case where the correlation value between the average speed distributions for detected object regions and B exceeds the merge base threshold, and where a rectangular region including detected object regions A and B (shown as detected object region A+B in the figure) is set up as one detected object region.

Thus, with object detection apparatus 200 with respect to Embodiment 4, it becomes possible to determine whether or not a plurality of detected object regions are regions that have been generated from the same object. If it is determined that they are regions generated from the same object, an erroneous separated detection may be corrected by merging those detected object regions.

[Embodiment 5]

In Embodiment 5, a filtering process is performed in advance on travel speed map information that is to be used for a detected object region correction process. Processes described in connection with Embodiment 5 are applicable to any of Embodiment 1, Embodiment 3, and Embodiment 4.

Figure 18:
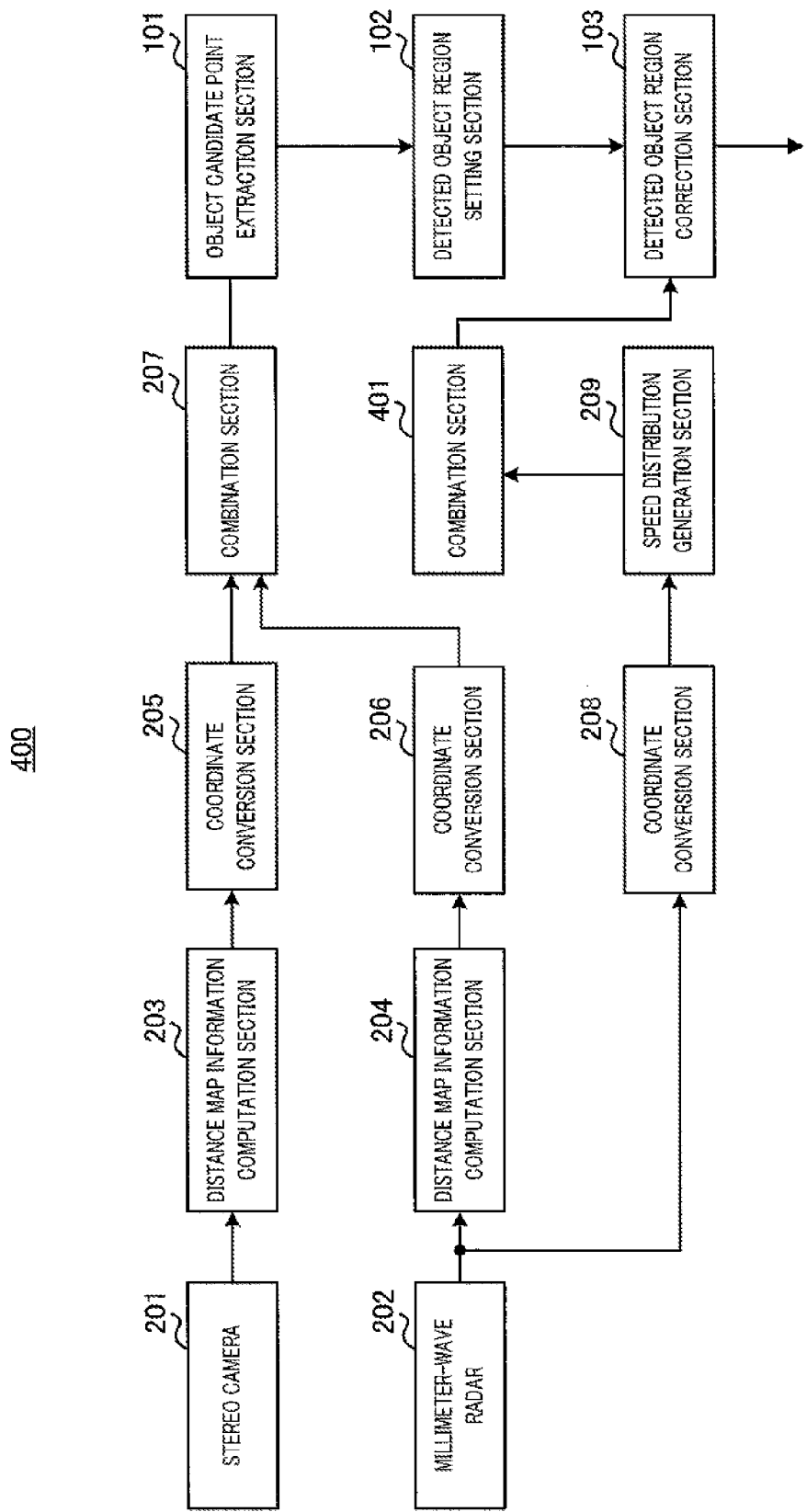
FIG. 18 is a block diagram showing elements of an object detection apparatus according to Embodiment 5 of the claimed invention.

FIG. 18 shows elements of object detection apparatus 400 according to Embodiment 5 of the claimed invention. With respect to FIG. 18, object detection apparatus 400 includes filter section 401.

Filter section 401 performs a smoothing process on the travel speed map information generated by speed distribution generation section 209. The smoothing filter used in this smoothing process has a property whereby it shifts the parallax coordinates of the travel speed map information in a direction that causes parallax to increase and by an amount corresponding to the installation height of object detection apparatus 400. In other words, this smoothing filter is weighted in such a manner as to shift the parallax coordinates of the travel speed map information in a direction that causes parallax to increase and by an amount corresponding to the installation height of object detection apparatus 400. By way of example, a filter coefficient representing this smoothing filter is given by the matrix provided as equation 5 below.

(Equation 5)

$$\frac{1}{16}\begin{bmatrix} 0 & 0 & 0 & 0 & 0 \\ 0 & 0 & 0 & 0 & 0 \\ 0 & 1 & 2 & 1 & 0 \\ 0 & 2 & 4 & 2 & 0 \\ 0 & 1 & 2 & 1 & 0 \end{bmatrix} \quad [5]$$

Figure 19B:
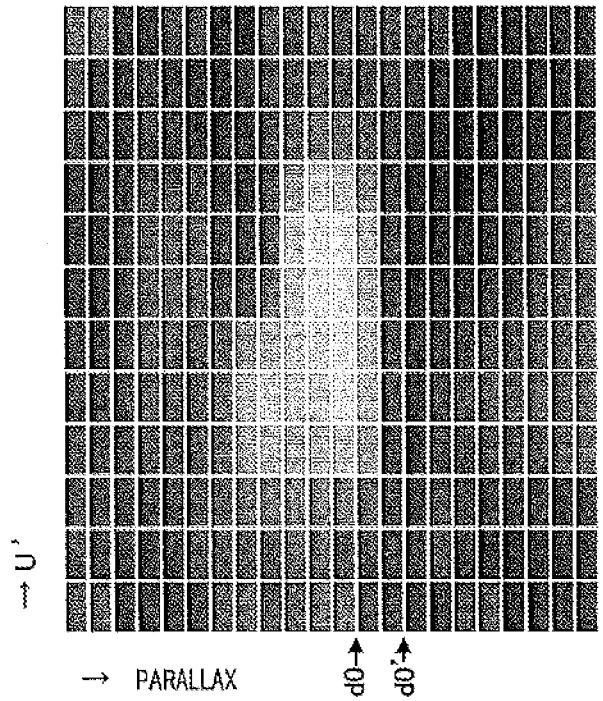
FIGS. 19A and 19B are diagrams illustrating a process by a filter section.
Figure 19A:
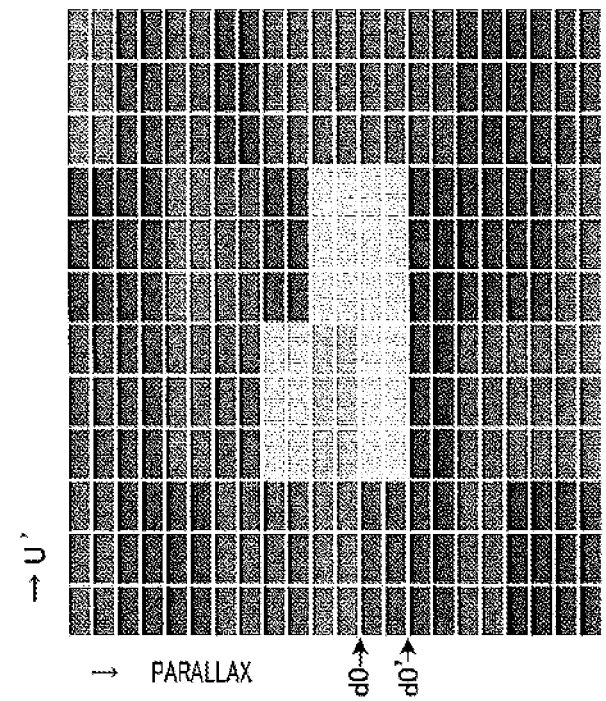

The filter coefficient represented by equation 5 reflects both a smoothing process and a shift process. The shift amount that results from the filter coefficient represented by equation 5 is one parallax coordinate in a direction that causes parallax to increase. FIGS. 19A and 19B are diagrams illustrating a process by filter section 401. FIG. 19A shows travel speed map information generated by speed distribution generation section 209. FIG. 19B shows travel speed map information obtained by applying to the travel speed map information in FIG. 19A a smoothing filter whose shift amount is (d'0−d0).

When height h of the installation position of object detection apparatus 400 is significant (e.g., when object detection apparatus 400 is installed atop a traffic light), travel speed map information that is obtained through conversion by coordinate conversion section 208 in such a manner that the virtual installation position of object detection apparatus 400 is taken to be on the road surface would include errors in speed generation position and speed value to some extent.

Figure 20A:
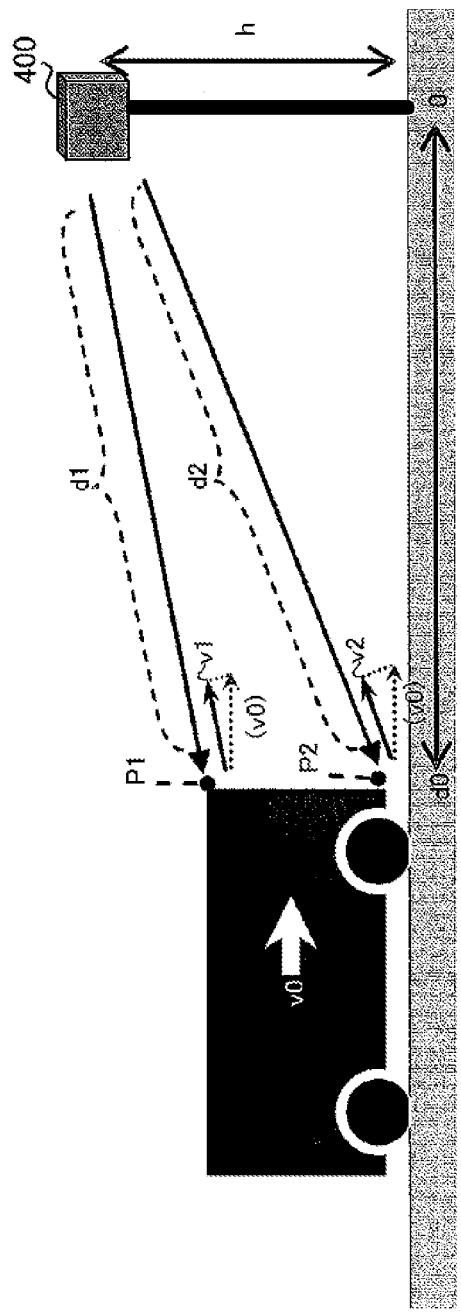
FIGS. 20A and 20B are diagrams illustrating errors in speed generation position and speed value.
Figure 20B:
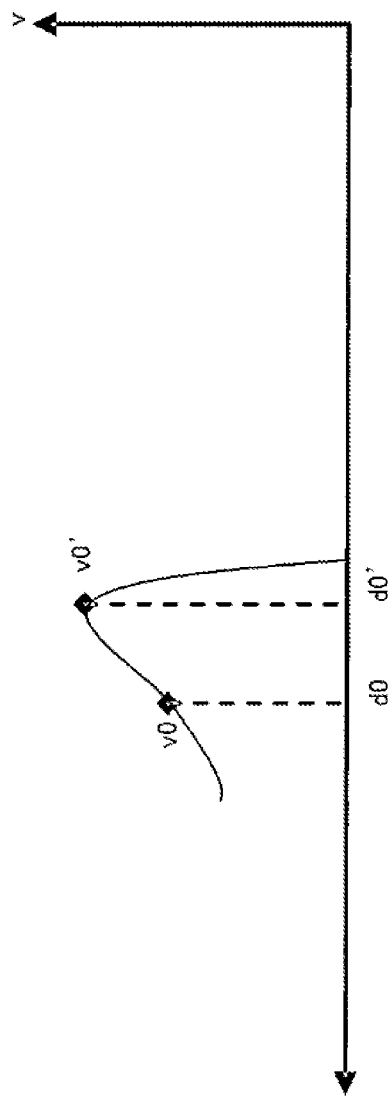

FIGS. 20A and 20B are diagrams illustrating errors with respect to speed generation position and speed value. FIG. 20A shows a vehicle at coordinate d0 approaching object detection apparatus 400 at speed v0. The antenna beam width of millimeter-wave radar 202 is typically a few degrees. Accordingly, as shown in FIG. 20A, if the vehicle is relatively tall, at one antenna of millimeter-wave radar 202, a reflected wave from the vehicle around the road surface and a reflected wave from around the roof of the vehicle would both be received.

It is assumed, in this case, that a reflection point corresponding to a part of the vehicle around its roof is P1, that the distance from object detection apparatus 400 to P1 is d1, that a reflection point corresponding to a part of the vehicle near the road surface is P2, and that the distance from object detection apparatus 400 to P2 is d2. As mentioned above, at coordinate conversion section 208, the travel speed map information obtained directly by millimeter-wave radar 202 is converted into travel speed map information where the virtual installation position of object detection apparatus 400 is taken to be on the road surface. Accordingly, assuming that the speed value detected at P1 is v1, that the speed value detected at P2 is v2, and that their respective values after conversion are v1' and v2', then v1' and v2' are given by equation 6 below.

[6]

$$v1'=v1/\cos(\arcsin(h/d1)), v2'=v2/\cos(\arcsin(h/d2)) \quad \text{(Equation 6)}$$

In the equation above, h denotes the installation height of object detection apparatus 400. Since the difference in height between object detection apparatus 400 and reflection point P2 is equal to h, v2' would be equal to speed v0 of the vehicle. However, since the difference in height between reflection point P1 and object detection apparatus 400 is less than h, v1' would be greater than vehicle speed v0. In other words, v1' contains an error. Furthermore, as shown in FIG. 20B, the speed generation point would also be converted to a point that is closer than the actual speed generation point d0. A speed generation position and a speed value thus containing errors are inputted to speed distribution generation section 209.

As such, in the present embodiment, a smoothing process using a smoothing filter is performed at filter section 401 on the travel speed map information generated by speed distribution generation section 209, the smoothing filter having a property whereby it shifts the parallax coordinates of the travel speed map information in a direction that causes parallax to increase and by an amount corresponding to the installation height of object detection apparatus 400. Thus, error components corresponding to the errors contained in the speed generation position and the speed value may be eliminated from the travel speed map information. Furthermore, object detection accuracy may be improved since detected object region correction section 103 is able to perform the detected object region correction process based on travel speed map information from which such error components have been eliminated.

[Embodiment 6]

In Embodiment 5, error components corresponding to errors contained in the speed generation position and the speed value were eliminated from travel speed map information using a filter. By contrast, in Embodiment 6, error components corresponding to errors contained in the speed generation position and the speed value are eliminated from travel speed map information using camera map information that has undergone coordinate conversion. Processes described in connection with Embodiment 6 are applicable to any of Embodiment 1, Embodiment 2, Embodiment 3, and Embodiment 4.

Figure 21:
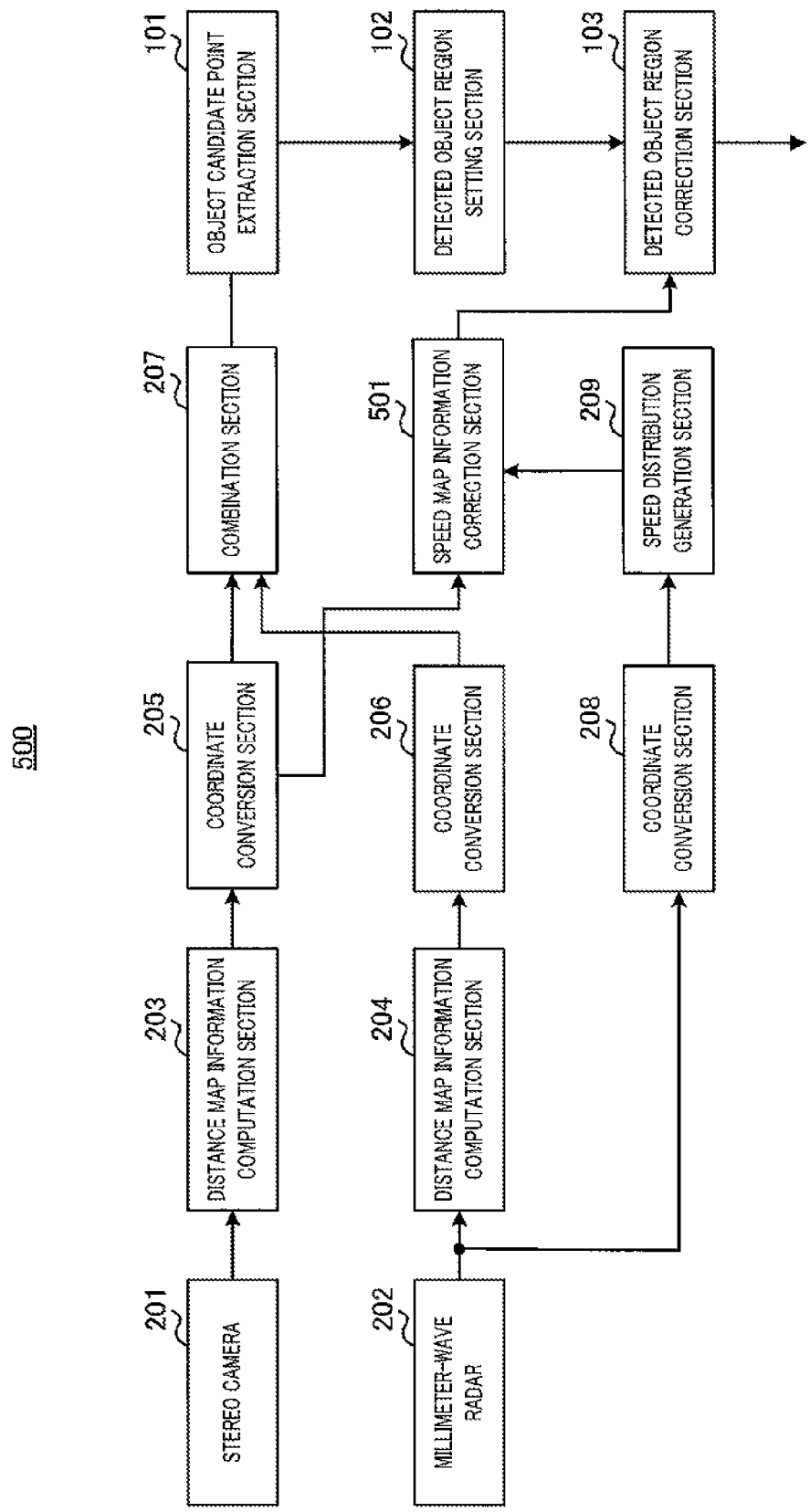
FIG. 21 is a block diagram showing elements of an object detection apparatus according to Embodiment 6 of the claimed invention.

FIG. 21 shows elements of object detection apparatus 500 according to Embodiment 6 of the claimed invention. With respect to FIG. 21, object detection apparatus 500 includes speed map information correction section 501.

Figure 22B:
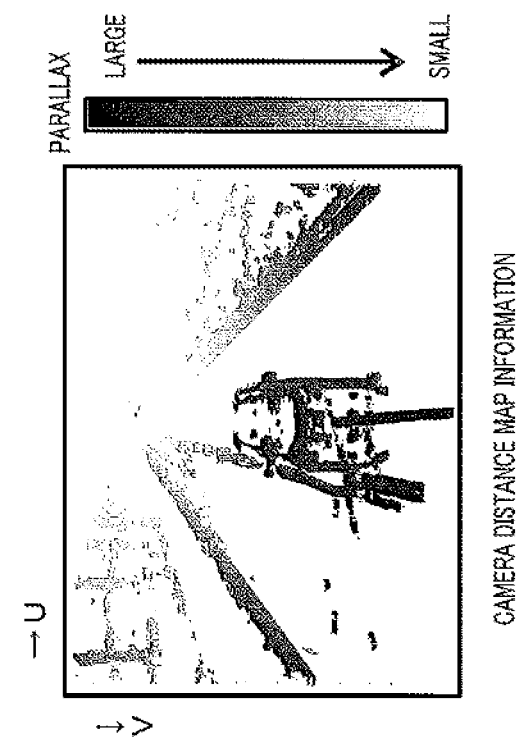
FIGS. 22A and 22B are diagrams illustrating camera distance map information obtained by a speed map information correction section.
Figure 22A:
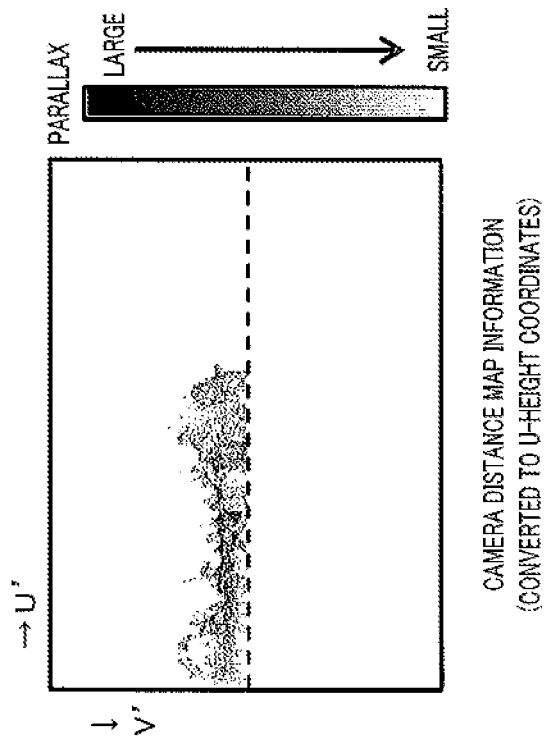

Speed map information correction section 501 obtains camera distance map information computed at coordinate conversion section 205 (see FIG. 22B) wherein camera distance map information in image plane coordinates (U, V) (see FIG. 22A) is projected onto image plane coordinates (U', V').

Using this camera distance map information that is projected onto image plane coordinates (U', V'), speed map information correction section 501 the corrects the travel speed map information generated at speed distribution generation section 209.

Specifically, with respect to the camera distance map information projected onto image plane coordinates (U', V') and based on the V' coordinate (which corresponds to the height information of the object) and the parallax value (which corresponds to the distance value of the object), speed map information correction section 501 identifies (U', V') coordinates that have been converted towards the side closer to object detection apparatus 500 than the actual distance (i.e., the side of lesser parallax value). Speed map information correction section 501 then corrects the travel speed map information by setting to zero the speed value at the (U', d) coordinates in the travel speed map information corresponding to the thus identified (U', V') coordinates.

The coordinates in the (U', d) coordinate system whose speed value is to be corrected to zero are given as follows,

[7]

$$(U', \sqrt{d^2+(h-v')^2-h^2}) \quad \text{(Equation 7)}$$

where h denotes the height of the installation position of object detection apparatus 500.

The coordinates in the (U', d) coordinate system for which the speed value is to be corrected to zero corresponds to d0' in FIG. 20B. In other words, through a correction process by speed map information correction section 501, error components corresponding to d0' may be eliminated. Through this elimination of error components, object detection apparatus 500 is able to detect an accurate object position and speed without being affected by the height of the object of interest.

[Other Embodiments]

(1) For Embodiments 1 through 6, descriptions have been provided with respect to cases where the subject of the object candidate point extraction process is combined map information. However, the claimed invention is by no means limited as such, and the camera distance map information obtained at distance map information computation section 203 could also be taken to be the subject of the object candidate point extraction process. In other words, combination section 207 is not a requisite element. Furthermore, in this case, distance map information computation section 204 and coordinate conversion section 206 are also not requisite elements.

(2) Although, for Embodiments 1 through 6, travel speed map information is not used by detected object region setting section 102 in labeling a set of object candidate points, it may also be used. In this case, the following condition is used as (Condition 3) which follows (Condition 1) and (Condition 2) mentioned above.

(Condition 3) Speed values respectively corresponding to the set of object candidate points to which the second type of label has been assigned under Condition 2 are obtained from the travel speed map information. The average of the thus obtained plurality of speed values is computed. From among the set of object candidate points to which the second type of label has been assigned under Condition 2, object candidate points having such a speed value that its difference relative to the computed average falls within a range of pre-defined value V are assigned a third type of label that differs from the first type of label and the second type of label.

Detected object region setting section 102 then generates a rectangle including the entire set of object candidate points to which the third type of label has been assigned (i.e., a detected object region candidate), and sets up a detected object region defined by this detected object region candidate. However, if another detected object region candidate exists within the detected object region candidate being generated, it generates a rectangle that does not include that detected object region candidate. Furthermore, for those object candidate points that did not fit into the generated detected object region candidate, the labeling process is repeated from Condition 1.

It is thus also possible to improve object detection accuracy in the detected object region setting process by using the travel speed map information generated at speed distribution generation section 209 (or by travel speed map information corrected with a filter, and/or the like).

(3) For Embodiment 3, a configuration was described where detected object region correction section 103 included erroneous merge correction processing section 131 and detected length correction processing section 141. For Embodiment 4, a configuration was described where detected object region correction section 103 included erroneous merge correction processing section 131 and erroneous separation correction processing section 151. However, the above are by no means limiting, and detected object region correction section 103 may also be so configured as to include erroneous merge correction processing section 131, detected length correction processing section 141, and erroneous separation correction processing section 151. In this case, the above would be connected in the following order: erroneous merge correction processing section 131, detected length correction processing section 141, erroneous separation correction processing section 151. Once the processes of erroneous merge correction processing section 131 and detected length correction processing section 141 have been completed, erroneous separation correction processing section 151 processes a plurality of detected object regions that are subject to processing.

(4) For the object detection apparatuses described in connection with the embodiments above, the antenna of millimeter-wave radar 202 and the optical portion of the imaging element of stereo camera 201 may be disposed in a housing separate from that of other functional parts. The distance from the object detection apparatus in such a case would be defined as the distance from a sensor portion including the antenna of millimeter-wave radar 202 and the optical portion of the imaging element of stereo camera 201.

(5) The embodiments above have been described taking as examples cases where the claimed invention is configured with hardware. However, the claimed invention may also be realized through software in cooperation with hardware.

The functional blocks used in the descriptions for the embodiments above are typically realized as LSIs, which are integrated circuits. They may be individual chips, or some or all of them may be integrated into a single chip. Although the term LSI is used above, depending on the level of integration, they may also be referred to as IC, system LSI, super LSI, or ultra LSI.

The method of circuit integration is by no means limited to LSI, and may instead be realized through dedicated circuits or general-purpose processors. Field programmable gate arrays (FPGAs), which are programmable after LSI fabrication, or reconfigurable processors, whose connections and settings of circuit cells inside the LSI are reconfigurable, may also be used.

Furthermore, should there arise a technique for circuit integration that replaces LSI due to advancements in semiconductor technology or through other derivative techniques, such a technique may naturally be employed to integrate functional blocks. Applications of biotechnology, and/or the like, are conceivable possibilities.

The disclosure of the specification, drawings, and abstract included in Japanese Patent Application No. 2011-053166, filed on Mar. 10, 2011, is incorporated herein by reference in its entirety.

INDUSTRIAL APPLICABILITY

An object detection apparatus and object detection method of the claimed invention are useful in that they are capable of improving object detection accuracy by preventing erroneous merged detections.

REFERENCE SIGNS LIST

100 Object detection processing apparatus
101 Object candidate point extraction section
102 Detected object region setting section
103 Detected object region correction section
131 Erroneous merge correction processing section
141 Detected length correction processing section
151 Erroneous separation correction processing section
200, 300, 400, 500 Object detection apparatus
201 Stereo camera
202 Millimeter-wave radar
203, 204 Distance map information computation section
205, 206, 208 Coordinate conversion section
207 Combination section
209 Speed distribution generation section
301, 401 Filter section
501 Speed map information correction section

The invention claimed is:

1. An object detection apparatus comprising:
    a candidate point extraction section configured to extract candidate points from combined map information combining camera distance map information in which coordinates in an image plane are mapped to information regarding object presence obtained based on a stereo image and radar distance map information in which the coordinates in the image plane are mapped to information regarding object presence obtained based on information detected by a radar, the candidate points being coordinates at which corresponding information regarding object presence is equal to or greater than a predetermined value;
    a setting section configured to arrange the extracted candidate points into groups based on values of the corresponding information regarding object presence, and that sets up, as a first detected object region, a region in the image plane including all candidate points of each group; and
    a correction section configured to:
        divide, with respect to travel speed map information in which the coordinates in the image plane are mapped to detected travel speeds detected by the radar, a first corresponding region, which corresponds to the first detected object region, into a plurality of partial regions in the direction of a first coordinate axis of coordinate axes of the image plane;
        compute a first correlation value with respect to the detected travel speeds between a representative partial region among the plurality of partial regions and a partial region other than the representative partial region; and
        divide the first detected object region into a plurality of second detected object regions based on the first correlation value.

2. The object detection apparatus according to claim 1, further comprising a region length correction section configured to:
  divide each of a plurality of second corresponding regions in the travel speed map information, which correspond to the plurality of second detected object regions, into a plurality of partial regions in the direction of a second coordinate axis of the coordinate axes of the image plane;
  compute, with respect to each of the plurality of second corresponding regions, a second correlation value with respect to the detected travel speeds between a representative partial region among the plurality of partial regions and a partial region other than the representative partial region; and
  generate a third detected object region by correcting the plurality of second corresponding regions based on the second correlation value.

3. The object detection apparatus according to claim 1, further comprising an erroneous separation correction section configured to:
  take at least two among the plurality of second detected object regions to be a set of processing target regions;
  compute, with respect to each of the processing target regions, an average value of a given coordinate along one of the coordinate axes of the image plane by averaging a plurality of detected speed values mapped to a plurality of coordinates that share the given coordinate while having differing coordinates along the other coordinate axis;
  compute an average speed distribution including average values for all coordinates along the one coordinate axis with respect to each of the processing target regions;
  compute a correlation value of average speed distributions between each pair of processing target regions in the set of processing target regions; and
  set up as a fourth detected object region a region including each of the pairs of processing target regions based on the computed correlation values among the average speed distributions.

4. The object detection apparatus according to claim 1, further comprising a smoothing process section configured to smooth the travel speed map information used at the correction section using a smoothing filter.

5. The object detection apparatus according to claim 1, wherein a coordinate system defining the image plane comprises a coordinate system defined by parallax and one coordinate axis in an image plane coordinate system wherein an installation position of the object detection apparatus is taken to be on a road surface rather than at the height at which the object detection apparatus is installed.

6. The object detection apparatus according to claim 4, wherein the smoothing filter has a property where each coordinate along one of two coordinate axes defining the image plane is shifted by an amount corresponding to the height at which the object detection apparatus is installed.

7. The object detection apparatus according to claim 1, further comprising a speed map information correction section configured to correct the travel speed map information based on second camera distance map information in which coordinates in an image plane coordinate system, where an installation position of the object detection apparatus is taken to be on a road surface rather than at the height at which the object detection apparatus is installed, are mapped to the information regarding object presence obtained based on the stereo image.

8. An object detection apparatus comprising:
  a candidate point extraction section configured to extract candidate points from camera distance map information in which coordinates in an image plane are mapped to information regarding object presence obtained based on a stereo image, the candidate points being coordinates at which corresponding information regarding object presence is equal to or greater than a predetermined value;
  a setting section configured to arrange the extracted candidate points into groups based on values of the corresponding information regarding object presence, and that sets up, as a first detected object region, a region in the image plane including all candidate points of each group; and
  a correction section configured to:
    divide, with respect to travel speed map information in which the coordinates in the image plane are mapped to detected travel speeds detected by a radar, a first corresponding region, which corresponds to the first detected object region, into a plurality of partial regions in the direction of a first coordinate axis of coordinate axes of the image plane;
    compute a first correlation value with respect to the detected travel speeds between a representative partial region among the plurality of partial regions and a partial region other than the representative partial region; and
    divide the first detected object region into a plurality of second detected object regions based on the first correlation value.

9. The object detection apparatus according to claim 8, further comprising a region length correction section configured to:
  divide each of a plurality of second corresponding regions in the travel speed map information, which correspond to the plurality of second detected object regions, into a plurality of partial regions in the direction of a second coordinate axis of the coordinate axes of the image plane;
  compute, with respect to each of the plurality of second corresponding regions, a second correlation value with respect to the detected travel speeds between a representative partial region among the plurality of partial regions and a partial region other than the representative partial region; and
  generate a third detected object region by correcting the plurality of second corresponding regions based on the second correlation value.

10. The object detection apparatus according to claim 8, further comprising an erroneous separation correction section configured to:
  take at least two among the plurality of second detected object regions to be a set of processing target regions;
  compute, with respect to each of the processing target regions, an average value of a given coordinate along one of the coordinate axes of the image plane by averaging a plurality of detected speed values mapped to a plurality of coordinates that share the given coordinate while having differing coordinates along the other coordinate axis;
  compute an average speed distribution including average values for all coordinates along the one coordinate axis with respect to each of the processing target regions;
  compute a correlation value of average speed distributions between each pair of processing target regions in the set of processing target regions; and set up as a fourth detected object region a region including each of the pairs of processing target regions based on the computed correlation values among the average speed distributions.

11. The object detection apparatus according to claim 8, further comprising a smoothing process section configured to smooth the travel speed map information used at the correction section using a smoothing filter.

12. The object detection apparatus according to claim 8, wherein a coordinate system defining the image plane comprises a coordinate system defined by parallax and one coordinate axis in an image plane coordinate system wherein an installation position of the object detection apparatus is taken to be on a road surface rather than at the height at which the object detection apparatus is installed.

13. The object detection apparatus according to claim 11, wherein the smoothing filter has a property where each coordinate along one of two coordinate axes defining the image plane is shifted by an amount corresponding to the height at which the object detection apparatus is installed.

14. The object detection apparatus according to claim 8, further comprising a speed map information correction section configured to correct the travel speed map information based on second camera distance map information in which coordinates in an image plane coordinate system, where an installation position of the object detection apparatus is taken to be on a road surface rather than at the height at which the object detection apparatus is installed, are mapped to the information regarding object presence obtained based on the stereo image.

* * * * *